United States Patent
Hogarth et al.

(10) Patent No.: US 7,029,637 B2
(45) Date of Patent: Apr. 18, 2006

(54) APPARATUS FOR OZONE PRODUCTION, EMPLOYING LINE AND GROOVED ELECTRODES

(75) Inventors: Derek J. Hogarth, Portland, OR (US); Jun Fu, Port Coquitlam (CA)

(73) Assignee: H2O3, Inc., Salem, OR (US)

( * ) Notice: Subject to any disclaimer, the term of this patent is extended or adjusted under 35 U.S.C. 154(b) by 510 days.

(21) Appl. No.: 10/338,692

(22) Filed: Jan. 9, 2003

(65) Prior Publication Data

US 2004/0136884 A1   Jul. 15, 2004

(51) Int. Cl.
*B01J 19/08* (2006.01)

(52) U.S. Cl. .............................. 422/186.07; 422/186.2
(58) Field of Classification Search ........... 422/186.07, 422/186.2
See application file for complete search history.

(56) References Cited

U.S. PATENT DOCUMENTS

| | | | |
|---|---|---|---|
| 3,198,726 A | 8/1965 | Trikilis | 204/320 |
| 3,400,071 A | 9/1968 | Zwoboda | 204/317 |
| 3,428,892 A | 2/1969 | Meinhard | 324/71 |
| 3,455,803 A | 7/1969 | Miller | 204/176 |
| 3,457,159 A | 7/1969 | Fortier | 204/313 |
| 3,496,092 A | 2/1970 | Fraser | 204/312 |
| 3,530,058 A | 9/1970 | Blanchard | 204/320 |
| 3,567,620 A | 3/1971 | Ingram | 204/313 |
| 3,568,627 A | 3/1971 | Flushing | 116/114 |
| 3,607,709 A | 9/1971 | Rice | 204/317 |
| 3,611,243 A | 10/1971 | Hardtl | 338/34 |
| 3,623,970 A | 11/1971 | Haas | 204/314 |
| 3,625,756 A | 12/1971 | Taguchi | 117/201 |
| 3,836,786 A | 9/1974 | Lowther | 250/540 |
| 3,838,290 A | 9/1974 | Crooks | 250/532 |
| 3,883,413 A | 5/1975 | Douglas-Hamilton | 204/176 |
| 3,899,685 A | 8/1975 | Francis et al. | 250/536 |
| 3,901,067 A | 8/1975 | Boardman, Jr. et al. | 73/23 |
| 3,942,020 A | 3/1976 | Ciambrone | 250/539 |
| 3,967,131 A | 6/1976 | Slipiec et al. | 250/539 |
| 3,979,193 A | 9/1976 | Sikich | 55/123 |
| 4,013,567 A | 3/1977 | Emelyanov et al. | 250/540 |
| 4,019,986 A | 4/1977 | Burris et al. | 210/139 |
| 4,034,229 A | 7/1977 | Grossen et al. | 250/541 |
| 4,035,657 A | 7/1977 | Carlson | 250/533 |
| 4,039,941 A | 8/1977 | Morrison | 324/71 SN |
| 4,049,707 A | 9/1977 | Harter et al. | 250/531 |
| 4,051,045 A | 9/1977 | Yamamoto et al. | 250/536 |
| 4,062,748 A | 12/1977 | Imris | 204/176 |
| 4,079,260 A | 3/1978 | Dmitriev et al. | 250/540 |
| 4,123,664 A | 10/1978 | Yamamura et al. | 250/536 |
| 4,128,768 A | 12/1978 | Yamamoto et al. | 250/535 |
| 4,130,490 A | 12/1978 | Lovelace et al. | 250/531 |
| 4,159,971 A | 7/1979 | Gneupel | 250/540 |

(Continued)

*Primary Examiner*—Kishor Mayekar

(57) ABSTRACT

An ozone generation cell has a first conductor generally having a line geometry and a second conductor having a first groove formed in a surface thereof, and having first and second flanks on opposite sides of the first groove. The second conductor and the first groove are arranged such that the first groove follows the first conductor in parallel spaced-apart relation. The ozone generation cell also has a first dielectric having a first passage-defining portion positioned between the first conductor and the first groove. The first dielectric has first and second side portions on opposite sides of the passage-defining portion that are generally parallel to the first and second flanks respectively. The first passage-defining portion is spaced-apart from only one of the first conductor and the first groove to form a first fluid passageway defined in part by the first passage-defining portion.

35 Claims, 15 Drawing Sheets

U.S. PATENT DOCUMENTS

| | | | |
|---|---|---|---|
| 4,167,466 A | 9/1979 | Orr, Jr. et al. | 204/176 |
| 4,203,946 A | 5/1980 | Ryerson | 422/98 |
| RE30,320 E | 7/1980 | Lowther | 204/176 |
| 4,214,995 A | 7/1980 | Saylor | 250/539 |
| 4,216,096 A | 8/1980 | Pare et al. | 250/539 |
| 4,240,799 A | 12/1980 | Ryerson | 23/232 E |
| 4,293,775 A | 10/1981 | Feuerstake et al. | 250/535 |
| 4,307,433 A | 12/1981 | Takechi et al. | 361/231 |
| 4,317,067 A | 2/1982 | Fitzsimmons et al. | 315/150 |
| 4,410,495 A | 10/1983 | Bassler et al. | 422/186.18 |
| 4,461,744 A | 7/1984 | Erni et al. | 422/186.18 |
| 4,462,965 A | 7/1984 | Azuma et al. | 422/186.08 |
| 4,504,446 A | 3/1985 | Kunicki et al. | 422/186.19 |
| 4,507,266 A | 3/1985 | Satoh et al. | 422/186.15 |
| 4,545,960 A | 10/1985 | Erz et al. | 422/186.12 |
| 4,580,439 A | 4/1986 | Manaka | 73/23 |
| 4,614,573 A | 9/1986 | Masuda | 204/176 |
| 4,640,782 A | 2/1987 | Burleson | 210/748 |
| 4,666,679 A | 5/1987 | Masuda et al. | 422/186.2 |
| 4,680,694 A | 7/1987 | Huynh et al. | 363/136 |
| 4,690,803 A | 9/1987 | Hirth | 422/186.18 |
| 4,696,800 A | 9/1987 | Sasaki et al. | 422/186.18 |
| 4,725,412 A | 2/1988 | Ito | 422/186.19 |
| 4,770,858 A | 9/1988 | Collins | 422/186.18 |
| 4,774,062 A | 9/1988 | Heinemann | 422/186.19 |
| 4,790,980 A | 12/1988 | Erni et al. | 422/186.15 |
| 4,816,229 A | 3/1989 | Jensen et al. | 422/186.2 |
| 4,818,498 A | 4/1989 | Bachhofer et al. | 422/186.2 |
| 4,857,277 A | 8/1989 | Broomfield | 422/186.07 |
| 4,859,607 A | 8/1989 | Lambert et al. | 426/135 |
| 4,863,701 A | 9/1989 | McMurray | 422/186.08 |
| 4,869,881 A | 9/1989 | Collins | 422/186.18 |
| 4,877,588 A | 10/1989 | Ditzler et al. | 422/186.19 |
| 4,882,129 A | 11/1989 | Andrews et al. | 422/186.2 |
| 4,885,929 A | 12/1989 | Kasahara et al. | 73/23 |
| 4,886,645 A | 12/1989 | Fischer et al. | 422/186.18 |
| 4,892,713 A | 1/1990 | Newman | 422/186.07 |
| 4,910,637 A | 3/1990 | Hanna | 361/229 |
| 4,954,321 A | 9/1990 | Jensen | 422/186.19 |
| 4,960,570 A | 10/1990 | Mechtersheimer | 422/186.21 |
| 4,963,331 A | 10/1990 | Mouw | 422/186.18 |
| 4,970,056 A | 11/1990 | Wooten et al. | 422/186.18 |
| 4,978,438 A | 12/1990 | Shimamune et al. | 204/265 |
| 4,986,968 A | 1/1991 | Hirth et al. | 422/186.19 |
| 4,988,484 A | 1/1991 | Karlson | 422/186.19 |
| 4,992,169 A | 2/1991 | Izumiya | 210/221.2 |
| 4,992,216 A | 2/1991 | Saita et al. | 261/122 |
| 4,992,246 A | 2/1991 | Serizawa et al. | 422/186.13 |
| 5,002,738 A | 3/1991 | Pin et al. | 422/186.13 |
| 5,002,739 A | 3/1991 | Ditzler et al. | 422/186.19 |
| 5,004,587 A | 4/1991 | Tacchi | 422/186.19 |
| 5,006,758 A | 4/1991 | Gellert et al. | 313/634 |
| 5,008,087 A | 4/1991 | Batchelor | 422/186.22 |
| 5,009,858 A | 4/1991 | Mechtersheimer | 422/186.19 |
| 5,013,959 A | 5/1991 | Kogelschatz | 313/36 |
| 5,034,198 A | 7/1991 | Kaiga et al. | 422/186.19 |
| 5,049,777 A | 9/1991 | Mechtersheimer | 313/35 |
| 5,089,098 A | 2/1992 | Tacchi | 204/176 |
| 5,093,087 A | 3/1992 | Freeman | 422/186.15 |
| 5,094,822 A | 3/1992 | Dunder | 422/186.22 |
| 5,106,589 A | 4/1992 | Conrad | 422/186.15 |
| 5,124,132 A | 6/1992 | Francis, Jr. et al. | 422/186.07 |
| 5,130,003 A | 7/1992 | Conrad | 204/176 |
| 5,137,697 A | 8/1992 | Lathan et al. | 422/186.15 |
| 5,145,350 A | 9/1992 | Dawson et al. | 422/186.15 |
| 5,145,653 A | 9/1992 | Fischer et al. | 422/186.18 |
| 5,147,614 A | 9/1992 | Conrad | 422/186.18 |
| 5,154,895 A | 10/1992 | Moon | 422/186.07 |
| 5,160,481 A | 11/1992 | Weaver | 422/186.07 |
| 5,169,606 A | 12/1992 | Batchelor | 422/186.19 |
| 5,211,919 A | 5/1993 | Conrad | 422/186.07 |
| 5,223,105 A | 6/1993 | Arthurson | 204/176 |
| 5,250,177 A | 10/1993 | Cho | 210/192 |
| 5,254,317 A | 10/1993 | Fischer et al. | 422/186.18 |
| 5,268,151 A | 12/1993 | Reed et al. | 422/186.16 |
| 5,269,893 A | 12/1993 | Conrad | 204/176 |
| RE34,571 E | 3/1994 | Uys | 422/186.07 |
| 5,316,639 A | 5/1994 | Okazaki et al. | 204/192.12 |
| 5,332,556 A | 7/1994 | Coakley et al. | 422/186.18 |
| 5,348,709 A | 9/1994 | Wheatley | 422/186.18 |
| 5,354,541 A | 10/1994 | Sali et al. | 422/186.07 |
| 5,364,600 A | 11/1994 | Stiehl et al. | 422/186.07 |
| 5,385,761 A | 1/1995 | Iwanaga | 427/448 |
| 5,401,368 A | 3/1995 | Ford et al. | 204/164 |
| 5,407,639 A | 4/1995 | Watanabe et al. | 422/186.07 |
| 5,409,673 A | 4/1995 | Mausgrover et al. | 422/186.07 |
| 5,411,713 A | 5/1995 | Iwanaga | 422/186.15 |
| 5,413,769 A | 5/1995 | Okazaki et al. | 422/186.07 |
| 5,417,936 A | 5/1995 | Suzuki et al. | 422/186.07 |
| 5,433,927 A | 7/1995 | Mausgrover et al. | 422/186.07 |
| 5,435,978 A | 7/1995 | Yokomi | 422/186.07 |
| 5,437,843 A | 8/1995 | Kuan | 422/186.07 |
| 5,443,800 A | 8/1995 | Dunder | 422/186.16 |
| 5,478,533 A | 12/1995 | Inculet | 422/186.07 |
| 5,503,809 A | 4/1996 | Coate et al. | 422/186.18 |
| 5,512,254 A | 4/1996 | Landgraf | 422/186.07 |
| 5,516,493 A | 5/1996 | Bell et al. | 422/186.07 |
| 5,518,698 A | 5/1996 | Karlson et al. | 422/186.18 |
| 5,525,310 A | 6/1996 | Decker et al. | 422/189.07 |
| 5,529,760 A | 6/1996 | Burris | 422/186.07 |
| 5,540,898 A | 7/1996 | Davidson | 422/186.15 |
| 5,547,644 A | 8/1996 | Taylor et al. | 422/186.18 |
| 5,549,795 A | 8/1996 | Gregoire et al. | 204/164 |
| 5,549,874 A | 8/1996 | Kamiya et al. | 422/186.04 |
| 5,552,125 A | 9/1996 | Chamblee et al. | 422/186.07 |
| 5,554,344 A | 9/1996 | Duarte | 422/186.07 |
| 5,569,437 A | 10/1996 | Stiehl et al. | 422/186.07 |
| 5,573,733 A | 11/1996 | Salama | 422/186.18 |
| 5,578,280 A | 11/1996 | Kazi et al. | 422/186.07 |
| 5,587,131 A | 12/1996 | Malkin et al. | 422/186.11 |
| 5,637,279 A | 6/1997 | Besen et al. | 422/186.07 |
| 5,641,461 A | 6/1997 | Ferone | 422/186.07 |
| 5,644,070 A | 7/1997 | Gibboney et al. | 73/23.2 |
| 5,667,756 A | 9/1997 | Ho | 422/186.18 |
| 5,695,619 A | 12/1997 | Williamson et al. | 204/165 |
| 5,705,131 A | 1/1998 | Rutland | 422/186.07 |
| 5,733,512 A | 3/1998 | Tsai et al. | 422/186.15 |
| 5,756,054 A | 5/1998 | Wong et al. | 422/186.08 |
| 5,762,886 A | 6/1998 | Jo | 422/186.18 |
| 5,766,560 A | 6/1998 | Cole | 422/186.18 |
| 5,824,274 A | 10/1998 | Long | 422/186.07 |
| 5,855,856 A | 1/1999 | Karlson | 422/186.11 |
| 5,871,701 A | 2/1999 | Long | 422/186.18 |
| 5,879,641 A | 3/1999 | Conrad et al. | 422/186.07 |
| 5,904,905 A | 5/1999 | Dolezal et al. | 422/186.04 |
| 5,908,603 A | 6/1999 | Tsai et al. | 422/186.07 |
| 5,911,957 A | 6/1999 | Khatchatrian et al. | 422/186.07 |
| 5,942,196 A | 8/1999 | Tabata et al. | 422/186.07 |
| 5,945,072 A | 8/1999 | Terada et al. | 422/186.07 |
| 5,948,374 A | 9/1999 | Kuzumoto et al. | 422/186.07 |
| 5,950,065 A | 9/1999 | Arlemark | 422/186.2 |
| 5,955,038 A | 9/1999 | Gadow et al. | 422/186.07 |
| 5,956,562 A | 9/1999 | Lo et al. | 422/186.2 |
| 6,007,785 A | 12/1999 | Liou | 422/186.07 |
| 6,019,950 A | 2/2000 | Lai | 422/186.12 |
| 6,024,930 A | 2/2000 | Racca et al. | 422/186.07 |
| 6,046,533 A | 4/2000 | Nakatsuka | 313/362.1 |
| 6,047,543 A | 4/2000 | Caren et al. | 60/275 |
| 6,060,027 A | 5/2000 | Conrad et al. | 422/186.07 |
| 6,093,289 A | 7/2000 | Kuzumoto et al. | 204/176 |
| 6,106,788 A | 8/2000 | Rau et al. | 422/186.07 |
| 6,117,685 A | 9/2000 | Omatsu et al. | 436/135 |
| 6,139,809 A | 10/2000 | Rodden | 422/186.07 |
| 6,165,423 A | 12/2000 | Crosbie | 422/186.07 |

| | | | | | | |
|---|---|---|---|---|---|---|
| 6,210,643 B1 | 4/2001 | Shiota .................... 422/186.07 | | 6,284,203 B1 | 9/2001 | Tokutake et al. ....... 422/186.07 |
| 6,214,298 B1 | 4/2001 | Tanimura et al. ...... 422/186.08 | | 6,284,205 B1 | 9/2001 | Murata et al. ......... 422/186.11 |
| 6,217,833 B1 | 4/2001 | Kolu ..................... 422/186.07 | | 6,322,759 B1 | 11/2001 | Riege et al. ........... 422/186.07 |
| 6,264,897 B1 | 7/2001 | Ishioka et al. ......... 422/186.07 | | 6,334,982 B1 | 1/2002 | Carlow et al. ......... 422/186.04 |
| 6,277,336 B1 | 8/2001 | Henrich et al. ........ 422/186.07 | | 6,372,097 B1 | 4/2002 | Chen .......................... 204/176 |

APPARATUS FOR OZONE PRODUCTION, EMPLOYING LINE AND GROOVED ELECTRODES

BACKGROUND OF THE INVENTION

1. Field of Invention

This invention relates to ozone generation cells and more particularly to an apparatus for ozone production, employing line and grooved electrodes.

2. Description of Related Art

Generally ozone generation cells employ two spaced-apart electrodes with a gap in between, in which an electric field is formed with sufficient strength to ionize a fluid such as air in the gap. The electric field has sufficient strength to ionize air when it is able to accelerate electrons released from the surface of one of the electrodes or a dielectric material in the gap such that they have sufficient kinetic energy to penetrate, or punch oxygen ($O_2$) molecules in the fluid in the gap causing them to split into two ions ($O+$) which readily combine with $O_2$ to create one ozone ($O_3$) molecule.

Not all electrons actually hit an $O_2$ molecule. Some electrons hit nitrogen ($N_2$) or other molecules in the gap and release their kinetic energy to those molecules as heat, optical or ultraviolet energy. Other electrons never hit any molecules in the gap, rather, they release their kinetic energy as heat, optical or ultraviolet energy when they hit the opposite electrode. Furthermore, not all electrons are released from the surfaces of electrodes or dielectrics with the same ease.

Desirably, the electric field created in the gap is configured to impart enough electrons with sufficient kinetic energy to punch $O_2$ molecules and desirably the gap is suitably dimensioned to expose released electrons to a sufficiently large number of $O_2$ molecules such that the probability that an electron will punch an $O_2$ molecule is maximized.

The kinetic energy imparted to electrons and thus the ability to ionize $O_2$ is highly dependent upon the electric field in the gap and on the ability of the surfaces defining the gap to release electrons. The electric field depends upon the potential applied to the electrodes, but once this potential is set, the electric field at any given point in the gap is affected by non-uniformities in the spacing between the electrodes, non-uniformities in the thickness of any dielectric material in the gap, lack of smoothness of discharge surfaces on the electrodes, and non-uniform airflow in the gap. These non-uniformities create localized changes in the electric field and affect the kinetic energy imparted to electrons in certain areas of the gap. Consequently, insufficient kinetic energy to ionize $O_2$ may be imparted to electrons in some areas and more kinetic energy than is required to ionize $O_2$ may be imparted to electrons in other areas.

In general, any electrons that do not punch an $O_2$ molecule to produce ions that ultimately become $O_3$ release their kinetic energy as optical energy, ultraviolet energy, or as heat either to the molecules in the gap, to the electrode to which the electrons are attracted or to the dielectric within the gap. The heat energy produced from the kinetic energy of the non-ozone-producing electrons heats up the fluid in the gap. Beyond a certain temperature, ozone production is diminished.

In areas where the kinetic energy imparted to electrons is optimum a localized ion cloud area may be formed which readily provides ions to incoming fluid in the gap. In areas where the kinetic energy is not used to create ions, localized non-ionization areas are formed, in which ozone production is not optimized.

What would be desirable therefore is a way of maximizing ion cloud areas within the air gap, while minimizing non-ion cloud areas, and a way of dissipating heat generated by the loss of kinetic energy of electrons that are not directly involved in the production of ozone, to optimize ozone production, or in other words, to produce ozone in the highest concentration with minimal expenditure of energy.

SUMMARY OF THE INVENTION

The present invention addresses the above need by providing an ozone generation cell having a first conductor generally having a line geometry and a second conductor having a first groove formed in a surface thereof, and having first and second flanks on opposite sides of the first groove. The second conductor and the first groove are arranged such that the first groove follows the first conductor in parallel spaced-apart relation. The cell further includes a first dielectric having a first passage-defining portion positioned between the first conductor and the first groove. The first dielectric also has first and second side portions on opposite sides of the first passage-defining portion and generally parallel to the first and second flanks respectively. The first passage-defining portion is spaced-apart from only one of the first conductor and the first groove to form a first fluid passageway defined in part by the first passage-defining portion, for conducting fluid from which ozone may be obtained when an electric field of sufficient strength is produced in the first fluid passageway by a potential applied across the first and second conductors.

The portion of the electric field used for creating ozone ($O_3$) is established between the first dielectric and at least one of the first and second conductors, and extends in a generally radial fashion within the first passageway. The first passageway is long compared to its width and thus air containing $O_2$ flowing through the passageway flows through any localized ion clouds within the passage, facilitating $O_3$ production. Non-ion cloud areas are minimized by carefully controlling the distance between the passage-defining portion of the first dielectric and the surface of the first or second conductor that forms part of the passageway. In one embodiment, this can be achieved through the use of a glass dielectric or ceramic dielectric material for example. Desirably, the first dielectric, the first conductor and the second conductor are gas-impervious.

The ozone generation cell may have a heat sink adjacent the first groove for dissipating the heat generated by the release of kinetic energy from electrons that do not contribute to ozone generation. The second conductor may act as the heat sink and the heat sink may extend on at least one side of the first groove. Desirably, the heat sink extends on both sides of the first groove and in one embodiment, the first and second flanks act as the heat sink. Holes may be drilled in the second conductor to further or alternatively facilitate cooling thereof.

The first conductor of the ozone generation cell may have a solid cross-section, a generally circular-shaped cross-section, a generally oval-shaped cross-section, a generally rectangular-shaped cross-section, or a generally "C"-shaped cross-section, for example. The first conductor may also have a conduit extending therethrough for conducting a cooling fluid to help dissipate heat from the first conductor. The first conductor may be comprised of a partially conductive coating.

In one embodiment, the first groove has a first groove surface that is generally concentric with a longitudinal axis of the first conductor. The first groove surface may be disposed at a generally uniform distance from an outer surface of the first conductor and the first groove may be generally uniformly curved in cross-section. The first passage-defining portion of the first dielectric may have a first parallel surface spaced-apart from the first groove by a generally uniform depth distance. Thus, the first passage-defining portion may be generally uniformly curved. The depth distance may be approximately equal to a width of the first groove, for example. The first parallel surface may be spaced-apart from an outer surface of the first conductor by a generally uniform thickness distance which may be less than or equal to the depth distance, for example.

In an alternative embodiment, the passage-defining portion may include a flat surface covering the first groove.

The first passage-defining portion may have first and second generally flat surfaces on opposite sides of the first parallel surface and these may also define part of the first passageway.

The second conductor may have first and second coplanar surfaces on opposite sides of the first groove. The first dielectric may also have first and second coplanar surfaces, on opposite sides of the first passage-defining portion and these first and second coplanar surfaces may be fastened to the first and second coplanar surfaces of the second conductor by adhesive, for example.

The ozone generation cell may further include a second dielectric in the first groove. The first and/or second dielectric may be comprised of a dielectric coating on a surface of the first groove.

In one embodiment the second conductor has a plurality of grooves formed therein and the first conductor has portions that extend parallel to and spaced-apart from corresponding grooves of the plurality of grooves in the second conductor. The grooves may be generally parallel to each other. The second conductor may have a conduit extending therethrough, for conducting fluid to the grooves and the ozone generation cell may include a first fluid flow director for directing fluid from the conduit to the grooves. The ozone generation cell may further include a second fluid flow director for directing fluid from one groove to another groove.

In another embodiment, the ozone generation cell may have a third conductor having a second groove formed in a surface thereof, and the third conductor may have third and fourth flanks on opposite sides of the second groove. The third conductor and the second groove may be arranged such that the second groove follows the first conductor in parallel spaced-apart relation and is associated with at least a portion of the first conductor. In this embodiment, the ozone generation cell further includes a second dielectric having a second passage-defining portion positioned between the first conductor and the second groove and the second dielectric may have third and fourth side portions on opposite sides of the second passage-defining portion and generally parallel to the third and fourth flanks, respectively. The second passage-defining portion may be spaced-apart from only one of the first conductor and the second groove to form a second fluid passageway defined in part by the second passage-defining portion, for conducting fluid from which ozone may be obtained when an electric field of sufficient strength is produced in the second fluid passageway by a potential applied across the first and the third conductors.

The first and second dielectric materials may have first and second spaced-apart facing surfaces forming a coolant passageway therebetween.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIGS. 5A to 5J are cross-sectional views of exemplary cross-sectional shapes of various alternate first conductors of the cell shown in FIG. 1;

DETAILED DESCRIPTION

General Introduction of Terms

Figure 1:
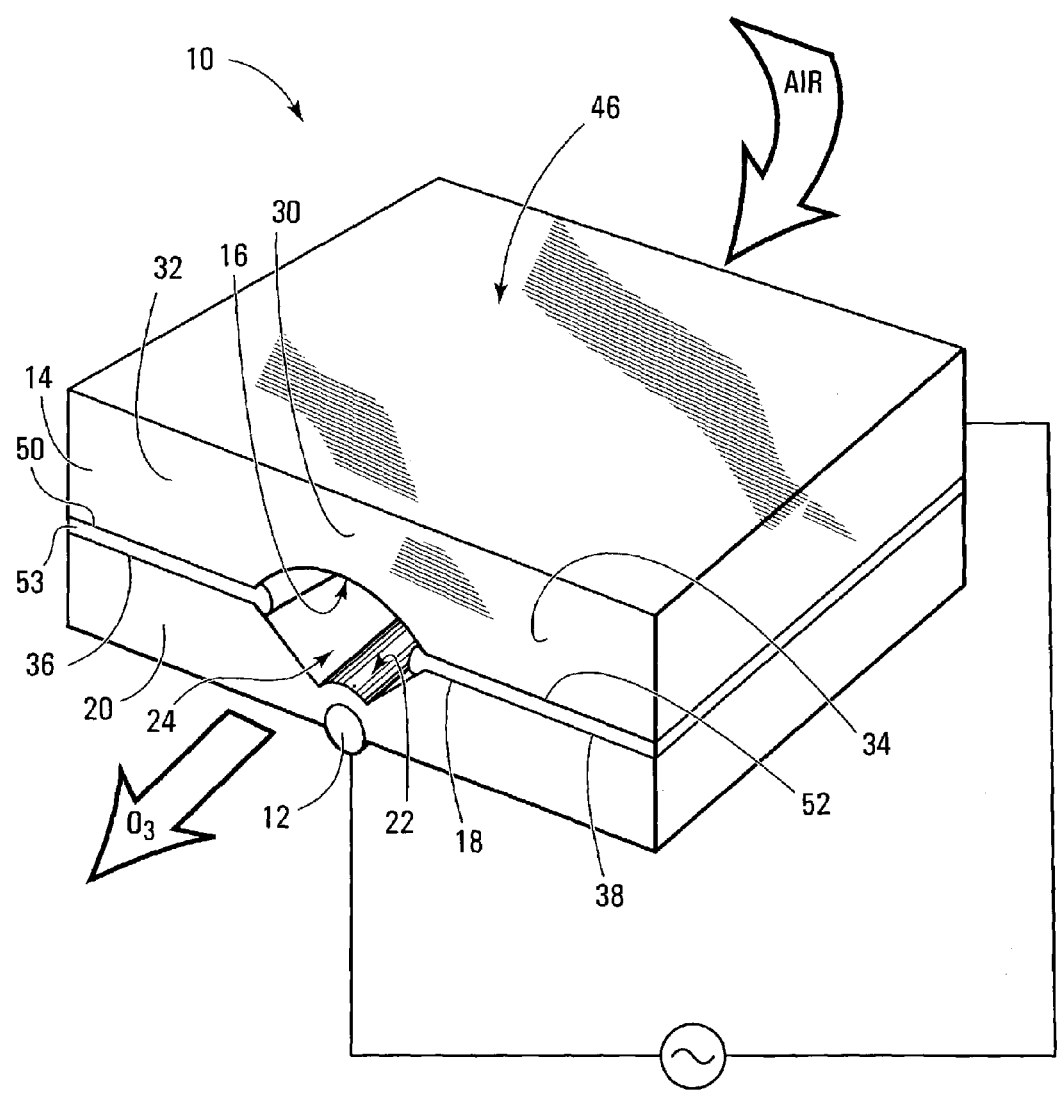
FIG. 1 is a schematic representation of an ozone generation cell according to a first embodiment of the invention.

Referring to FIG. 1, an ozone generation cell according to a first embodiment of the invention is shown generally at 10.

The cell 10 includes a first conductor 12 generally having a line geometry and a second conductor 14 having a first groove 16 formed in a surface 18 thereof. The first groove 16 and the second conductor 14 are positioned relative to the first conductor 12 such that the first groove follows the first conductor in parallel spaced-apart relation. The cell 10 further comprises a first dielectric material 20 having a first passage-defining portion shown generally at 22 positioned between the first conductor 12 and the first groove 16. In the embodiment shown, the first passage-defining portion 22 is spaced-apart from the first groove 16 to form a first fluid passage way 24 defined in part by the groove. The fluid passageway 24 is operable to conduct fluid from which ozone may be obtained when an electric field of sufficient strength is produced in the first fluid passageway by a potential applied across the first and second conductors 12 and 14 and a fluid such as air containing oxygen is passed through the first fluid passageway.

One of ordinary skill in the art would readily appreciate how to apply a potential across the first and second conductors 12 and 14 to produce an electric field of sufficient strength in the first fluid passageway 24 to obtain ozone from air therein.

Second Conductor Properties

Figure 2:
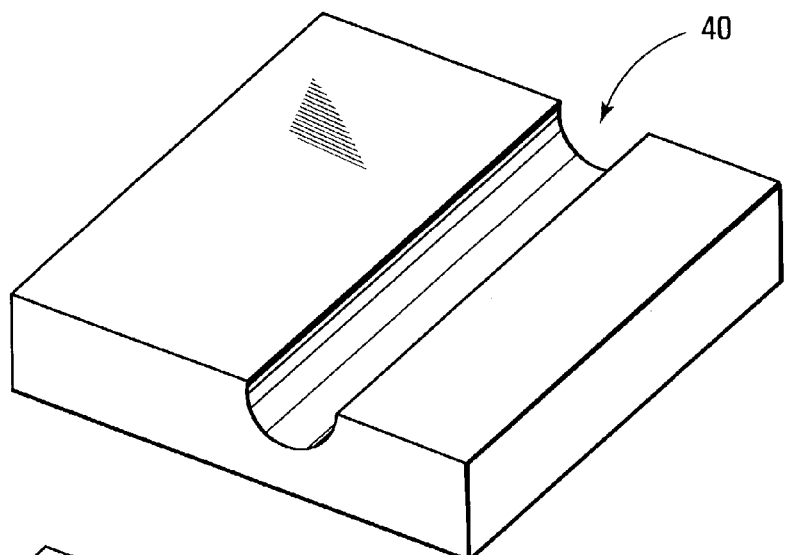
FIGS. 2, 3 and 4 are perspective views of a second conductor of the cell shown in FIG. 1 having various alternate groove configurations.

In the embodiment shown, the second conductor 14 is formed from a rectangular piece of aluminum having a relatively thick generally planar shape. Other conductive materials may alternatively be used. The first groove 16 may be formed in the aluminum piece using a milling machine, or may be die-cast or shell-cast, for example, and may have a variety of shapes but it has been found that a uniformly curved groove (i.e. a relatively constant radius of curvature) provides good results. The first groove 16 may be linear in a longitudinal direction, for example, of the aluminum piece or may be curved or serpentine as shown at 40, 42 and 44 in FIGS. 2, 3 and 4, for example, or the first groove may have a shape formed from a combination of these and/or other shapes.

Referring back to FIG. 1, the cell 10 comprises a heat sink shown generally at 46 which dissipates heat generated due to the conversion of kinetic energy to heat energy by electrons in the first fluid passageway 24 that do not contribute to the production of ozone ($O_3$). In the embodiment shown, the second conductor 14 itself acts as the heat sink 46. In particular, the second conductor 14 has a grooved portion 30 immediately opposite the first groove 16 and has first and second flanks 32 and 34 on opposite sides of the grooved portion. In this embodiment, the grooved portion 30 and the first and second flanks 32 and 34 serve to dissipate heat generated in the first fluid passageway 24. Other heat sink arrangements would also work, including use of a separate, finned heat sink, for example, in thermal contact with the grooved portion 30. Alternatively, or in addition, a heatsink may be in thermal contact with the first and/or second flank (32 and/or 34). It has been found however, that simple use of the first and second flanks 32 and 34 to dissipate heat from the first fluid passageway may be convenient and cost-effective.

In the embodiment shown, the first and second flanks 32 and 34 have first and second coplanar surfaces 36 and 38 respectively, on opposite sides of the first groove 16. The first dielectric material 20 is formed from a planar piece of gas-impervious solid ceramic, glass, porcelain, Teflon®, polyethylene or polypropylene material, for example, having its own first and second coplanar surfaces 50 and 52, on opposite sides of the passage-defining portion 22. The first dielectric material 20 and the second conductor 14 may be bolted together, for example, such that the first and second coplanar surfaces 50 and 52 of the first dielectric material 20 are pressed against the first and second coplanar surfaces 36 and 38 of the second conductor. Alternatively, the first and second coplanar surfaces 50 and 52 may be adhered to the first and second coplanar surfaces 36 and 38 of the second conductor 14, by a gas-impervious adhesive sealant 53 such as a silicone-based sealant such as DAP® brand adhesive/sealant available from Dow-Corning. In general, the first dielectric material 20 and the second conductor 14 are secured together such that the passage-defining portion 22 of the first dielectric material 20 is positioned adjacent the first groove 16. Thus, in this embodiment, the first fluid passageway 24 is formed between the first groove 16 in the second conductor 14 and the first passage-defining portion 22 of the first dielectric material 20.

First Conductor Properties

In this embodiment, where the first fluid passageway 24 is formed between the first groove 16 and the first passage-defining portion 22, the first conductor 12 is positioned on the first dielectric material 20 in a symmetrical position immediately opposite the passage-defining portion 22. The first conductor 12 may be a solid copper wire, for example, extending in or on the first dielectric material 20, opposite the first passage-defining portion 22. Stranded wire of the same gauge would also work. The first conductor 12 has a line-geometry, meaning that it is very much longer than its width. Also, its width is much less than the width of the first groove 16. In the embodiment shown, the first conductor 12 may be a length of solid copper wire of about 9 to about 24 gauge (about 0.5 mm to 3 mm), for example, but generally, the apparatus can be scaled up or down with consequences to the overall size of the cell, airflow, concentration of ozone in the outflow air and power consumption. In general the smaller the diameter of the first conductor, the better, subject to the ability of the wire and its surroundings to dissipate heat created due to current flow in the first conductor 12 and absorption of kinetic energy of electrons in some embodiments.

Figure 5J:
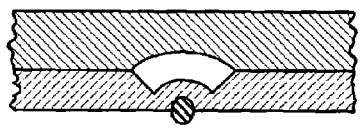
Figure 5J:
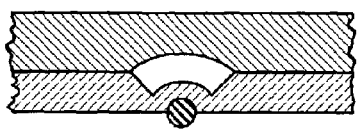
Figure 5J:
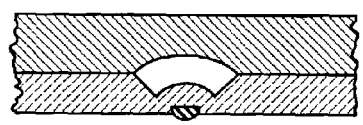
Figure 5J:
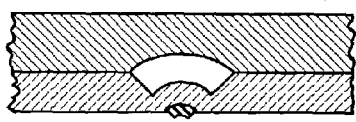
Figure 5J:
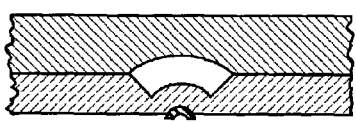
Figure 5J:
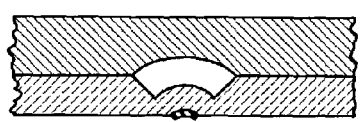
Figure 5J:
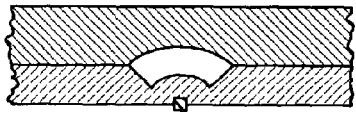
Figure 5J:
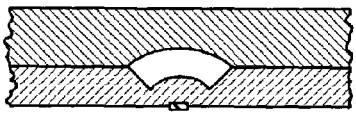
Figure 5J:
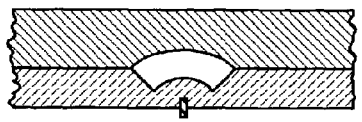
Figure 5J:
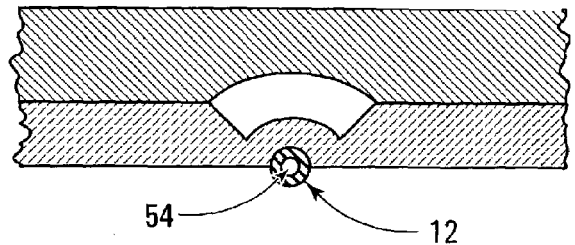

The first conductor 12 may have any of a plurality of cross-sectional shapes. Some exemplary cross-sectional shapes are shown in FIGS. 5A–5J, and include an oval shape (FIG. 5A), a circular shape (FIG. 5B), a half-disk shape (FIG. 5C), a gently concaved thick arcuate shape (FIG. 5D), a tightly curved C shape (FIG. 5E), a gently curved thin arcuate shape (FIG. 5F), a square rectangular shape (FIG. 5G), an elongated rectangular shape (FIGS. 5H and 5I). These are not the only shapes that may be used and it will be readily appreciated from the foregoing that any of a wide variety of shapes may be employed.

The oval-shaped first conductor shown in FIG. 5A has the effect of concentrating the electric field in the passageway, however wire of this shape tends to be more expensive than wire of circular cross-section. The circular cross-sectional shaped wire shown in FIG. 5B is relatively inexpensive and causes a generally uniformly shaped electric field to be formed around the conductor. The conductor cross-sectional shapes shown in FIGS. 5C–5F may be formed by deposition of a conductive metallic film onto the surface of the dielectric. The generally rectangular cross-sectional shaped conductors shown in FIGS. 5G–5I result in less uniform, but adequately shaped electric fields within the passageway.

Any of the aforementioned shapes may be formed with a conduit extending lengthwise therein such as shown in FIG. 5J in which a first conductor 12 having an otherwise circular cross-section has a conduit 54 formed therein. The first conductor 12 may thus alternatively be a pipe or tube, for example. When the first conductor 12 has a conduit 54 formed therein, cooling fluid, such as air or water may be made to flow through the conduit to dissipate heat generated at the first conductor due to the flow of electric current through it when ozone is produced.

Shape and Dimensions of First Passageway

Referring Back to FIG. 1, the shape of the first groove 16 and the shape of the first passage-defining portion 22 shown in the first embodiment influence the electric field produced within the first fluid passageway 24, causing it to be relatively uniform angularly across the first fluid passageway to create an ion cloud in the first fluid passageway 24, thereby effecting a relatively efficient and stable ozone production area that extends in a longitudinal direction along the entire first fluid passageway. The entire first fluid passageway 24 is efficient at producing ozone.

Dimensional Details

Figure 6:
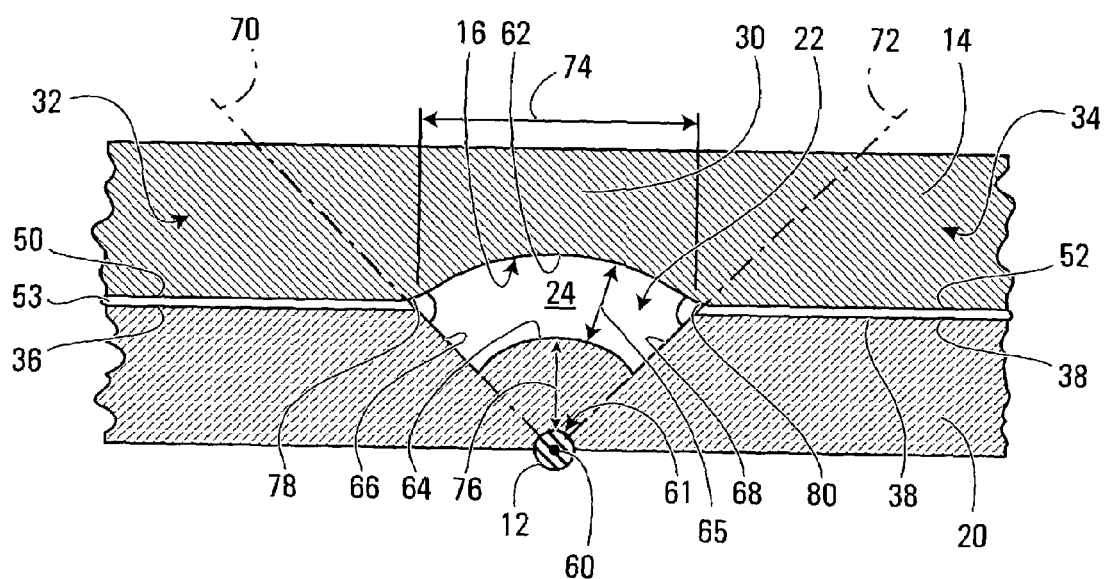
FIG. 6 is a cross-sectional view of the cell shown in FIG. 1 illustrating features of a first passageway in the cell, in detail.

The shapes of various components defining the first fluid passageway 24 and hence the shape of the electric field within the first passageway, for the first embodiment are shown in greater detail in FIG. 6. In this embodiment, the first conductor 12 has a circular shape in cross-section, symmetric about a longitudinal axis 60. The first conductor 12 thus has an outer surface 61 that is uniformly curved at a first constant radial distance from the axis 60.

The first groove 16 in the second conductor 14 is formed such that it is defined by a uniformly curved surface 62 that will be disposed at a generally uniform distance from the outer surface 61 of the first conductor 12, when the first dielectric material 20 is adhered to the second conductor 14 as shown.

The first dielectric material 20 is formed with a passage-defining portion 22 comprised of a parallel surface 64, generally parallel to the curved surface 62 defining the first groove 16, at a uniform depth distance 65. In this embodiment the parallel surface 64 is bounded on opposite sides by first and second generally flat surfaces 66 and 68 that are coplanar with first and second radially extending planes 70 and 72, respectively, extending generally at right angles to each other, generally radially from the axis 60. The first fluid passageway 24 is thus seen to have an arcuate shape concentric with the axis 60 of the first conductor 12. Hence, electric field lines extend uniformly radially outwardly from the surface 61 of the first conductor 12 to the surface 62 defining the first groove 16 and are concentrated in intensity within the first passageway 24.

It has been found that relatively uniform airflow occurs along the first passageway 24 when the width 74 of the first groove 16 is approximately equal to the distance 65 between the surface 62 forming the first groove 16 and the parallel surface 64 of the passage-defining portion 22. This distance 65 may be between about 1 mm and about 3 mm, for example. This effects a good delivery of air containing oxygen ($O_2$) to the ion cloud created by the electric field in the passageway 24.

In addition, the heat dissipated by the first and second flanks 32 and 34 is sufficient to prevent overheating of the air in the first passageway 24 thereby avoiding the negative effects of high air temperature on ozone production.

With the above dimensions, mechanical integrity is achieved and a desirable electric field may be achieved with a 12 kV potential applied across the first and second conductors 12 and 14 when the thickness 76 of the first dielectric material 20, measured between the outer surface 61 of the first conductor 12 and the parallel surface 64 of the passage-defining portion 22, is about 0.5 mm to about 3 mm. Furthermore the shape of the electric field may be improved by gently rounding transition surfaces 78 and 80 on opposite sides of the groove 16, of first and second coplanar surfaces 36 and 38 of the second conductor 14. The combination of the electric field created along the passageway and the ability of the first passageway 24 to deliver just the right amount of $O_2$ to ion clouds created in the first passageway by the electric field results in efficient ozone production.

Single Dielectric Alternative Configurations

Figure 7A:
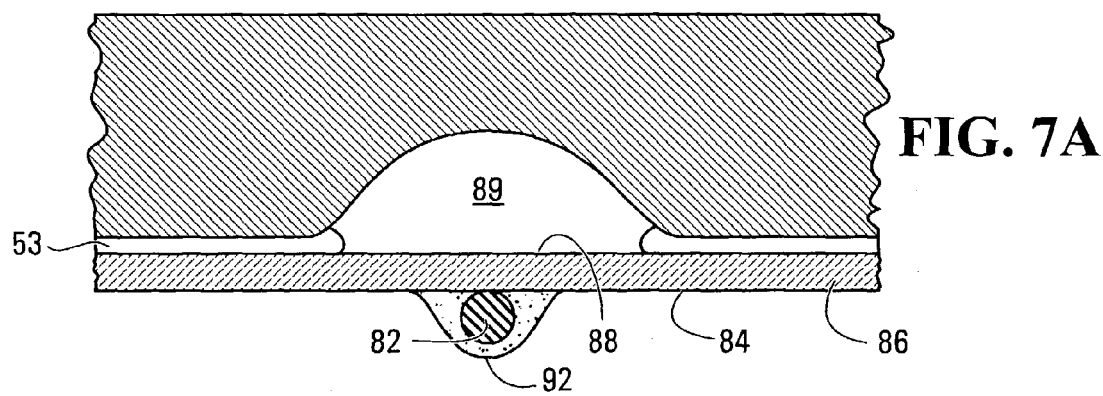
FIGS. 7A to 7E are cross-sectional views of various alternate single dielectric cell configurations.

Referring to FIGS. 7A–E various other first dielectric and first conductor configurations may be employed. For example, as shown in FIG. 7A, a solid circular cylindrical shaped first conductor 82, such as 9–24 gauge solid wire may be secured along one side 84 of a flat planar first dielectric material 86 by epoxy resin 92 or other insulative adhesive material. In this case, a passage-defining portion of the first dielectric material 86 may be entirely planar as shown at 88, creating a circular segment shaped passageway 89.

Figure 7B:
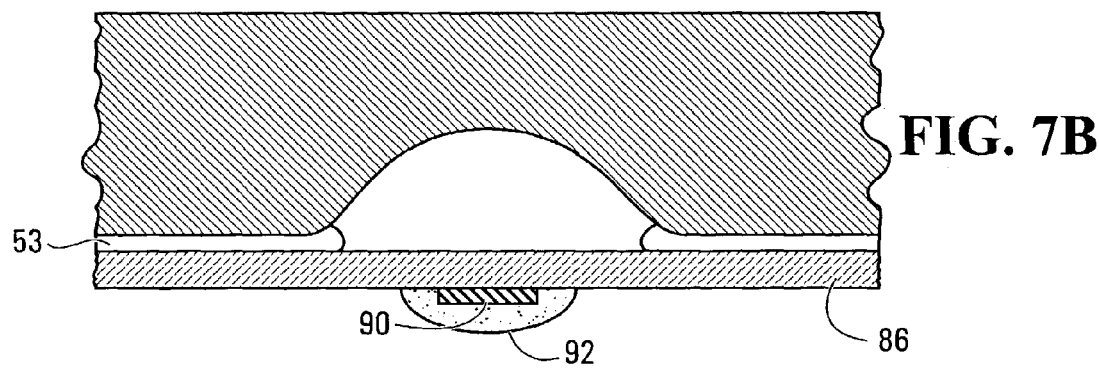

FIG. 7B shows another alternative embodiment similar to that shown in FIG. 7A but with a first conductor 90 having an elongated rectangular shape secured to the first dielectric material 86 by epoxy resin 92. The first conductor 90 may be formed from a flat wire or may be a strip of copper or aluminium, for example sputtered onto the first dielectric material. Alternatively, referring to FIG. 7E, the first conductor 90 may be formed on a mylar sheet 91 or tape, for example and the sheet or tape may be adhesively fastened to the first dielectric material 86 such that the first conductor is positioned adjacent to the groove in the second conductor 14 in the location shown. Conductors having the cross-sectional shapes shown in FIGS. 7A and 7B simple to build and therefore relatively low cost.

Figure 7C:
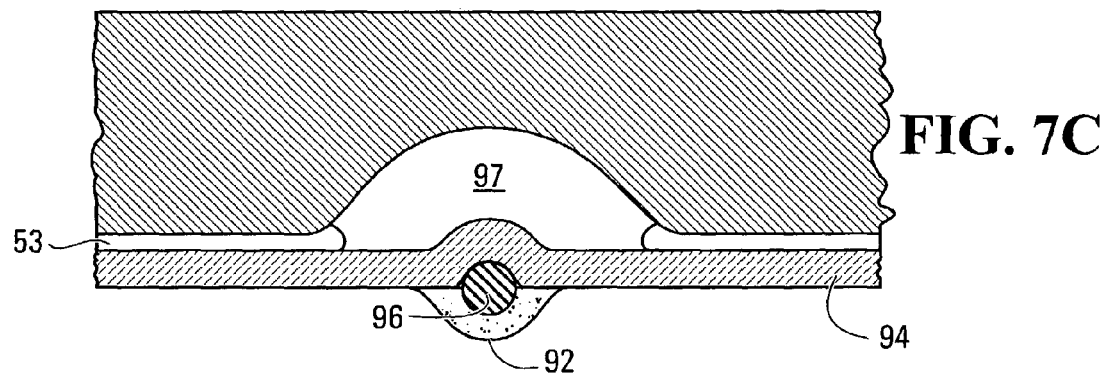

FIG. 7C shows another alternative embodiment having first dielectric material 94 bent or having a groove in which is received and secured a first conductor 96. The first dielectric thus forms a passageway 97 having a cross-sectional shape similar to that of the first embodiment.

Figure 7D:
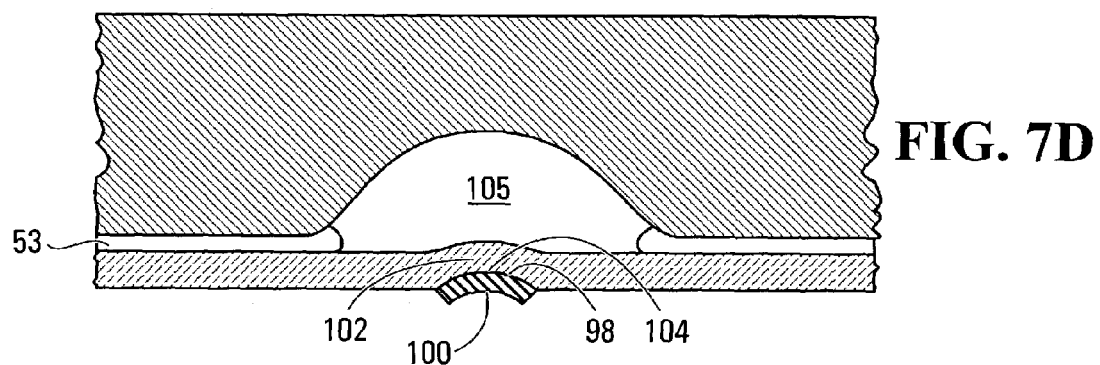
Figure 7E:
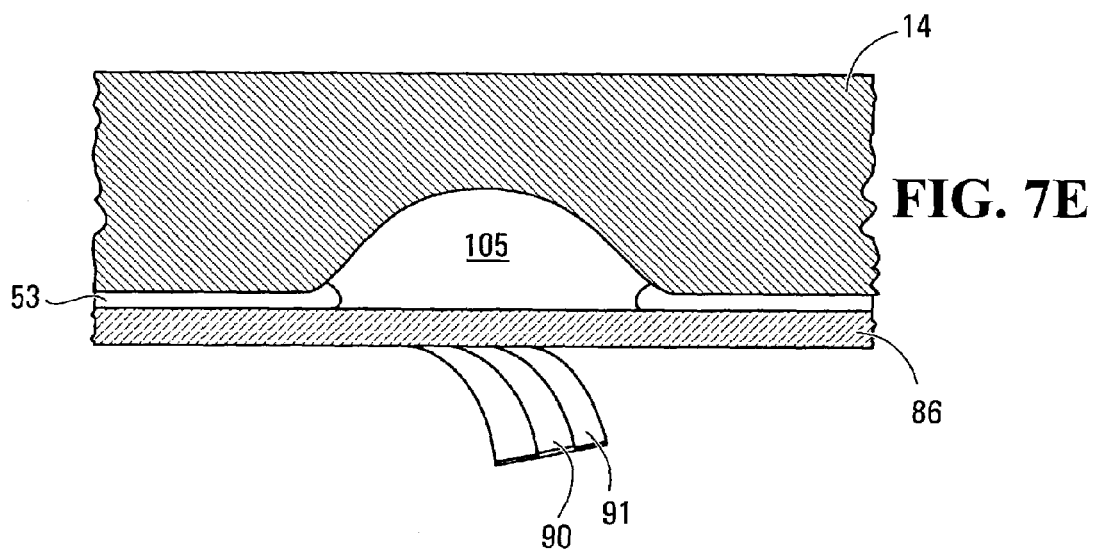

FIG. 7D shows an alternative embodiment having a first conductor 98 having a gentle concave shape with a curved inner surface 100 and a first dielectric 102 curved to receive an opposite outer surface 104 of the first conductor to form a passageway 105 with a cross-sectional shape similar to that of the first embodiment.

In any of the embodiments shown in FIGS. 7A and 7B, the first conductor may be formed by a metallized coating applied to an outer surface of the first dielectric and, as shown in FIGS. 7C and 7D, the first conductor may be formed by a metallized coating applied to a groove formed in the first dielectric material, for example.

In all of the embodiments shown in FIGS. 7A–7D, the first conductors may be protected by a coating such as epoxy resin 92 and the epoxy resin may also be used to secure the conductors to their respective dielectrics.

Generally, in the embodiments shown in FIGS. 7C and 7D, the dielectrics may be shaped to have a surface that follows a portion of an outer surface of the first conductor 96 or 98. This tends to produce a more uniform electric field in the passageway 97 or 105.

Double Dielectric

Figure 8A:
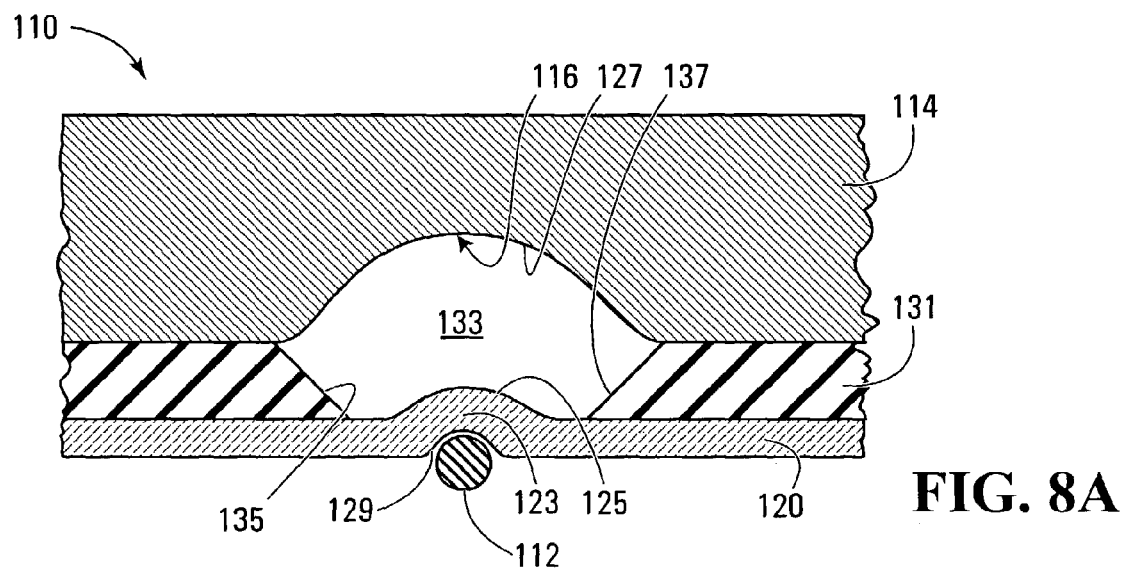
FIGS. 8A to 8B are cross-sectional views of various alternate double dielectric configurations of the cell shown in FIG. 1.
Figure 8B:
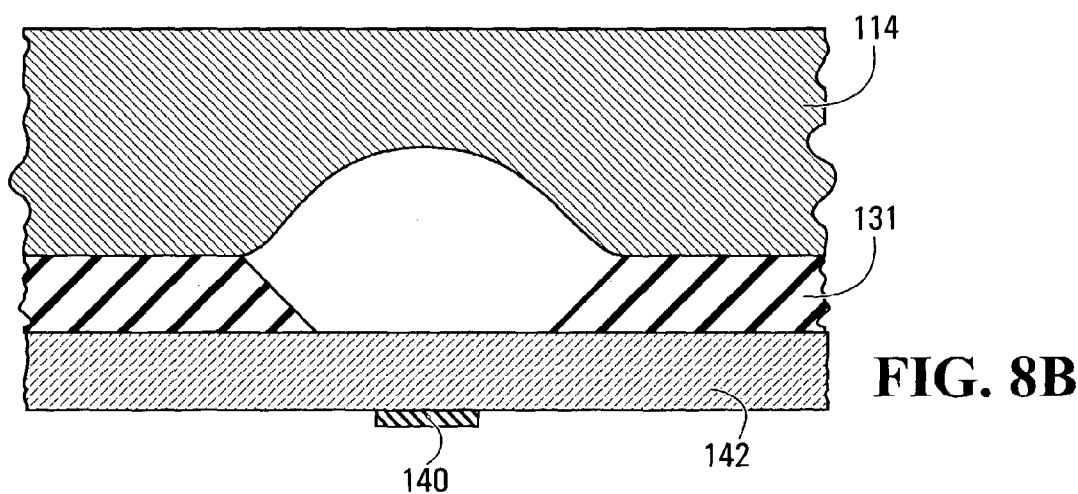

Referring to FIGS. 8A–8B, ozone generation cells according to other embodiments of the invention are shown. FIG. 8A shows an ozone generation cell 110 comprising a first conductor 112 having a generally line geometry, a second conductor 114 having a groove 116 formed in a surface thereof, arranged in a manner similar to that shown in connection with the first embodiment. The cell 110 further includes first and second dielectric materials 120 and 131, respectively. In this embodiment, the first dielectric material 120 must have sufficient dielectric strength to withstand, without breakdown, the electric field immediately adjacent the first conductor 112. In this embodiment the first dielectric material 120 is relatively planar and is shaped to have a curved portion 123 with a parallel surface 125 defining at least a portion of a passageway and generally parallel to a surface 127 defining the groove 116. The curved portion 123 also has an indented surface 129 forming a depression lengthwise in the cell, in which the first conductor 112 is laid and secured by epoxy resin, for example.

The second dielectric material 131 is a good insulator and is discontinuous laterally across the cell and has a gap 133 bounded by angled surfaces 135 and 137 extending away from and on opposite sides of the groove 116 and parallel surface 125.

Use of two different dielectric materials allows the dielectric properties of the materials to be selected, balancing cost and desired electric field properties. For example, the first dielectric may have to be of high quality to withstand the concentrated electric field to which it is exposed. The second dielectric however, serves to space apart the first dielectric and the second conductor is not present within the passageway, and is not subjected to the same electric field experienced by the first dielectric. Consequently, it may be made of a less expensive material such as concrete, asbestos, rubber or any other ozone-impervious material. The second dielectric may also be selected to provide heat conduction properties as well as sufficient dielectric properties and spacing to achieve a desired electric field shape and strength in the passageway. The use of the second dielectric as a spacer provides for suitable spacing to permit a higher potential to be applied across the first and second conductors.

Referring to FIG. 8B, an ozone generation cell according to an alternative embodiment is comprised of a first conductor 140 having a generally rectangular cross-section, a second conductor the same as the second conductor 114 shown in FIG. 8A, a flat planar continuous first dielectric material 142 and a discontinuous second dielectric material 131 the same as the second dielectric material shown in FIG. 8A. The first conductor may be provided on a mylar sheet or tape as described in connection with FIG. 7E for example.

The cell shown in FIG. 8B is generally less expensive to make than the cell shown in the embodiment shown in FIG. 8A. In addition, the use of two dielectrics allows for cost and performance considerations to be balanced, as described above.

Double Dielectric with Portion of First Conductor in Passageway

Figure 9A:
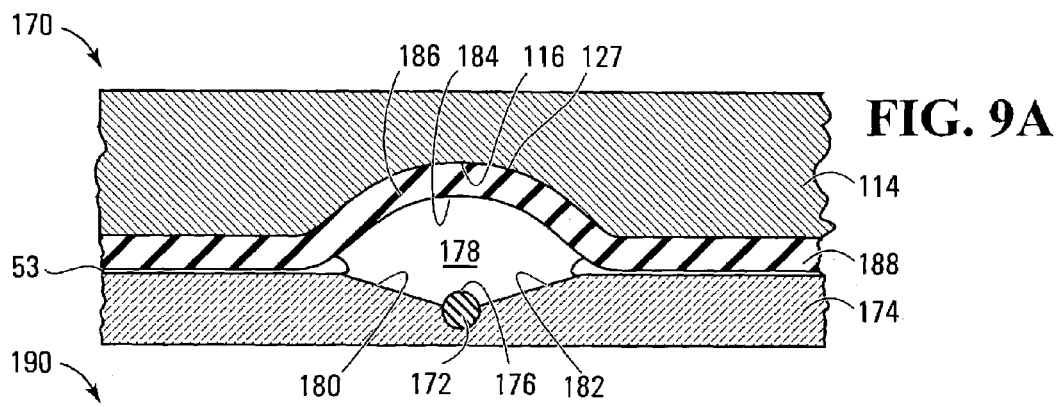
FIGS. 9A to 9E are cross-sectional views of various alternate double dielectric configurations in which at least a portion of the first conductor forms part of an ozone-producing passageway of the cell.

Referring to FIGS. 9A–9E various other embodiments of ozone generation cells are shown. Generally in each of these embodiments, an ozone-producing passageway is defined at least partially by a first conductor and two dielectric materials. Referring to FIG. 9A, an example of such a cell is shown generally at 170. In this embodiment, the cell includes a first conductor 172 embedded in a first dielectric material 174 in such a manner that at least a portion of an outer surface 176 of the first conductor is exposed to and defines part of a passageway 178 that is further defined by first and second flat planar surfaces 180 and 182 and a curved surface 184 of a curved portion 186 of a second dielectric material 188 positioned between the first dielectric material 174 and the second conductor 114. The curved portion 186 extends into the groove 116 in the second conductor 114 and contacts a groove-defining surface 127 thereof. Thus, in this embodiment, the first fluid passageway 178 is defined by at least a portion of the first conductor 172 and at least a portion of the first dielectric material 174 and at least a portion of the second dielectric material 188.

Figure 9B:
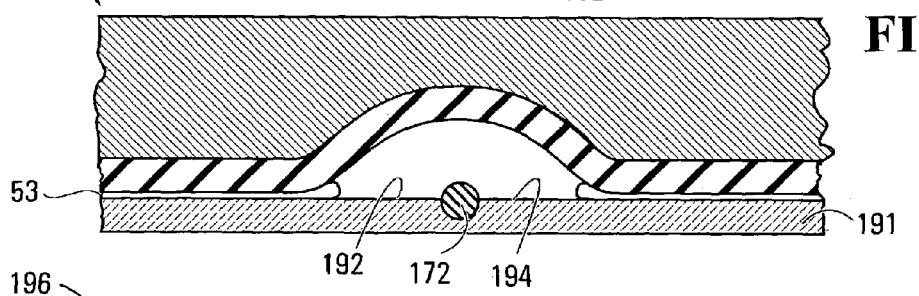

Referring to FIG. 9B, a cell similar to that shown in FIG. 9A is shown at 190, however, it includes a first dielectric material 191 that is generally flat planar and omits the angled surfaces shown in FIG. 9A at 180 and 182 and replaces them with first and second coplanar surfaces 192 and 194.

Figure 9C:
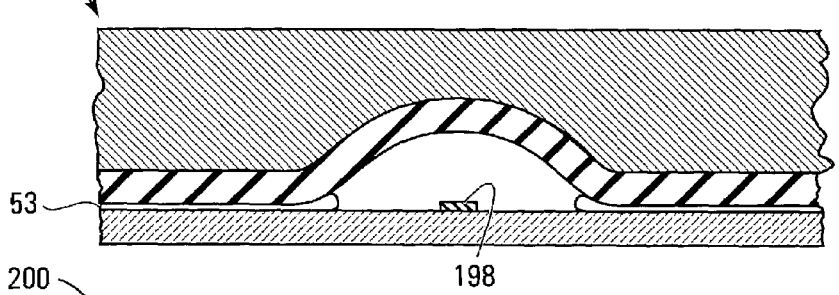

FIG. 9C shows a cell 196 similar to that shown in FIG. 9B in which the circular cross-sectioned first conductor 172 is replaced with a solid rectangular cross-sectioned first conductor 198. This solid rectangular cross-sectioned first conductor 198 may be applied to the dielectric material 191 as a film, using conventional film deposition techniques as described above, for example.

Figure 9D:
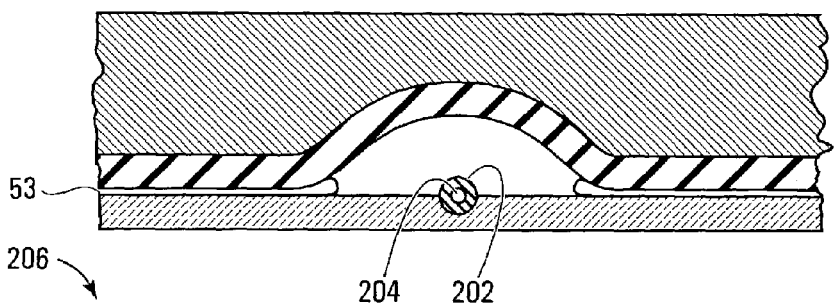

FIG. 9D shows a cell 200 similar to that shown in FIG. 9B, in which the circularly cross-sectioned first conductor 172 is replaced with a circular cross-sectioned first conductor 202 having a longitudinally extending conduit 204 therein. The conduit 204 may be used to conduct a cooling fluid such as air or water to cool the first conductor 202.

In general, the embodiment shown in FIG. 9A provides good results and provides for the largest passageway of all of the cells shown in FIGS. 9A–9E. The embodiments shown in FIGS. 9B and 9C tend to be less expensive, but less efficient. The embodiment shown in FIG. 9D permits a cooling fluid to be passed through the first conductor.

Figure 9E:
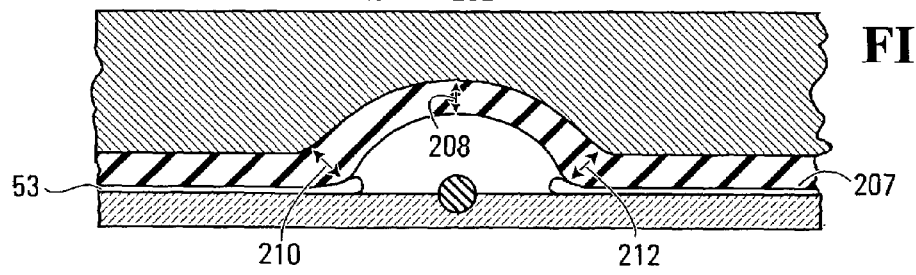

FIG. 9E shows a cell 206 similar to that shown in FIG. 9B in which a second dielectric material 207 is shaped to have a varying thickness in the groove 116 such that a first thickness 208 of the second dielectric material in a deepest part of the groove 116 is less than a second thickness 210 and 212 of the second dielectric material adjacent opposite sides of the groove. This tends to smooth out corners of the second dielectric, resulting in a smoother, less concentrated electric field at corners of the second dielectric in contact with the first dielectric.

In general, the embodiments shown in FIGS. 9A–9E have a second dielectric that follows the surface of the groove in the second conductor. At this location, the electric field is less concentrated, imposing less burden on the second dielectric. Consequently, the second dielectric need not be as strong as in the embodiments shown in FIGS. 15A–5J, 6, 7A–7D and 8A–8B, for example, and thus can be made relatively thin. Porcelain material is particularly suitable for this application.

Block Shaped Cell

Figure 3:
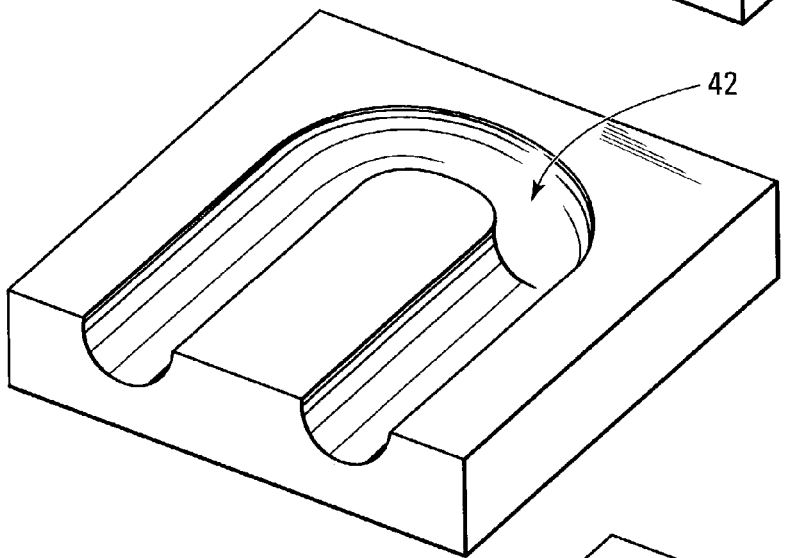
Figure 4:
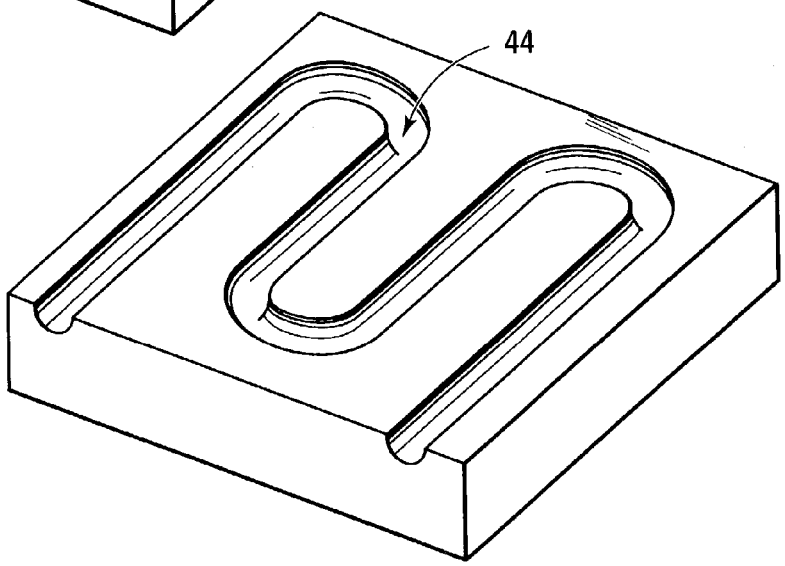
Figure 10:
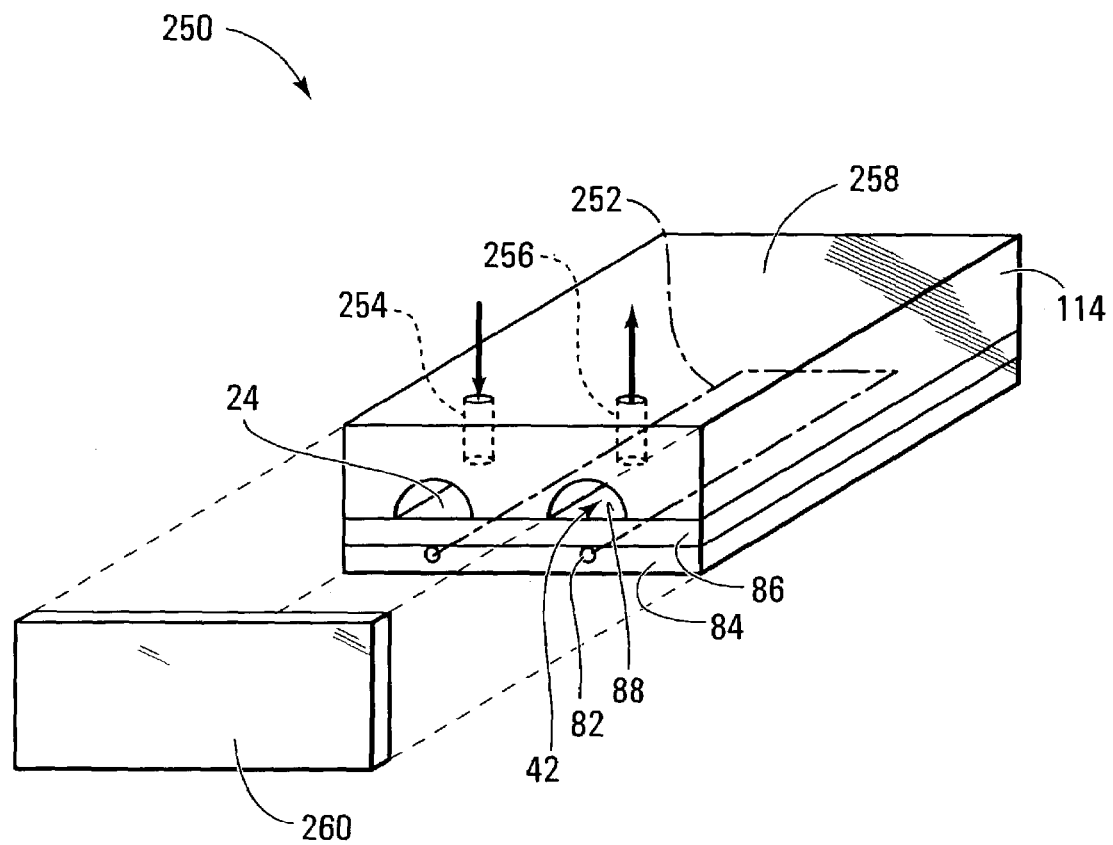
FIG. 10 is an exploded schematic representation of an alternate ozone generation cell employing the conductor and dielectric configurations shown in FIG. 7A.

Referring to FIG. 10, an ozone generation cell employing the conductor and dielectric configuration shown in FIG. 7A is shown generally at 250. In this embodiment, the first conductor 82 has a solid circular-shaped cross-section and extends in a U-shape as shown by centreline 252, on one side 84 of the flat planar first dielectric material 86. The second conductor 114 has a corresponding U-shaped groove 42 as shown in FIG. 3. Alternatively, the first conductor 82 and groove 42 in the second conductor 114 may be formed into other shapes, such as the serpentine shaped groove shown in FIG. 4, for example. An inlet conduit 254 and an outlet conduit 256 are formed through the second conductor 114 from an outside face 258 thereof to respective end portions of the groove 42. The inlet and outlet conduits 254 and 256 provide for the introduction and extraction of air into the first fluid passageway 24 bounded by the groove 42 and the flat planar passage-defining portion 88 of the first dielectric material 86.

An end cap 260 may be fastened to an end face of the cell to seal the ends of the first fluid passageway 24 such that air can be admitted through the inlet conduit 254 and air containing ozone can be extracted from the first fluid passageway through the outlet conduits 256.

Cylindrical Shaped Cell with Long Grooves

Figure 11:
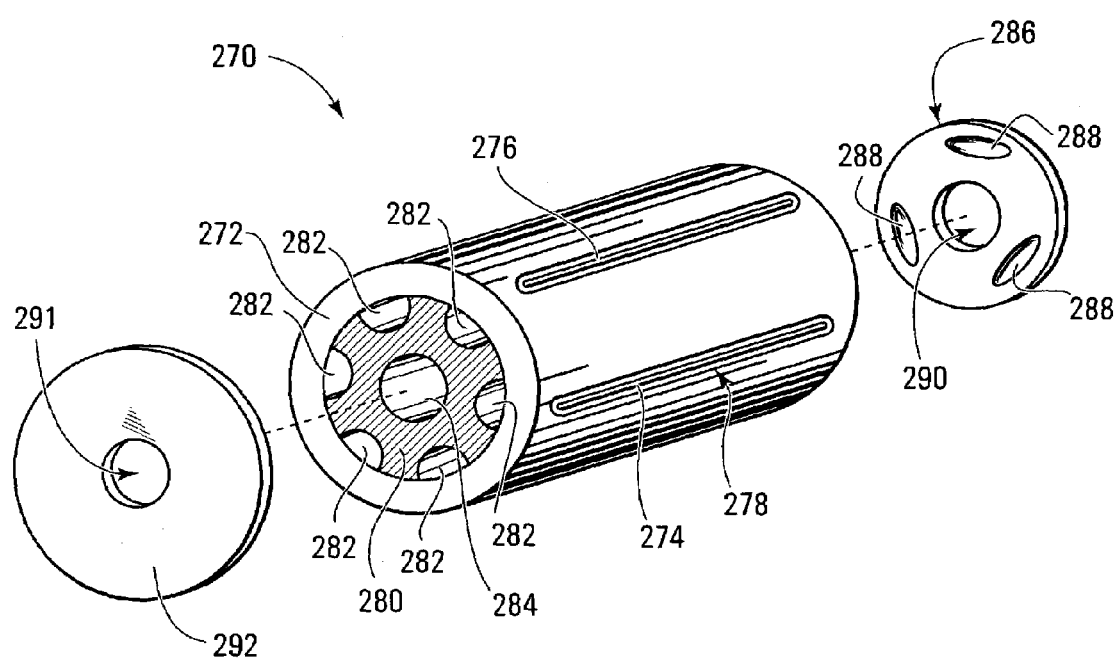
FIG. 11 is an exploded pictorial representation of an ozone generation cell according to an alternative embodiment in which the cell is cylindrically-shaped, with longitudinal ozone-producing passageways therein.

Referring to FIG. 11, an apparatus according to an alternative embodiment of the invention is shown generally at 270 and comprises a cylindrical sleeve 272 formed of dielectric material which acts as a support for angularly spaced-apart lengths, only two of which are shown at 274 and 276, of a first conductor 278. The lengths 274 and 276 extend lengthwise of the sleeve 272 in angular spaced-apart relation. The sleeve 272 is received over a generally cylindrically-shaped second conductor 280 having a plurality of grooves 282 formed to extend lengthwise therein. The angular spacing of the grooves 282 is selected to match the angular spacing of the lengths 274, 276, etc., of the first conductor 278 such that when the sleeve 272 is received over the second conductor, the lengths 274, 276, etc., are positioned adjacent to, parallel to, and are uniformly spaced from respective grooves 282 in the second conductor 280.

The second conductor 280 also has a central conduit 284, which may be used as a cooling conduit either by drawing air therethrough or by drawing a cooling liquid such as water therethrough. An end cap such as shown generally at 286 has a plurality of spaced-apart depressions 288 formed therein, each one being of sufficient length and angular spacing so as to couple adjacent ends of adjacent grooves 282 to form U-shaped passageways. The end cap 286 may also have a central opening 290 to provide access to the central conduit 284 in the second conductor 280. A similar end cap 292 may be secured to the opposite end of the cell 270 and may have a central opening 291 and depressions (not shown) similar to those shown at 288 that can be aligned with pairs of adjacent grooves 282. The first and second end caps 286 and 292 are angularly offset relative to each other such that the end caps co-operate to couple the grooves 282 in such a manner that a serpentine air passageway is formed up and down the length of the cell 270 by the grooves 282 and the end caps 286 and 292. Inlet and outlet conduits (not shown) may be provided in either or each of the end caps 286 and 292 to permit entry and exit of air into the serpentine passageway.

Cylindrically-Shaped Cell with Helical Groove

Figure 12:
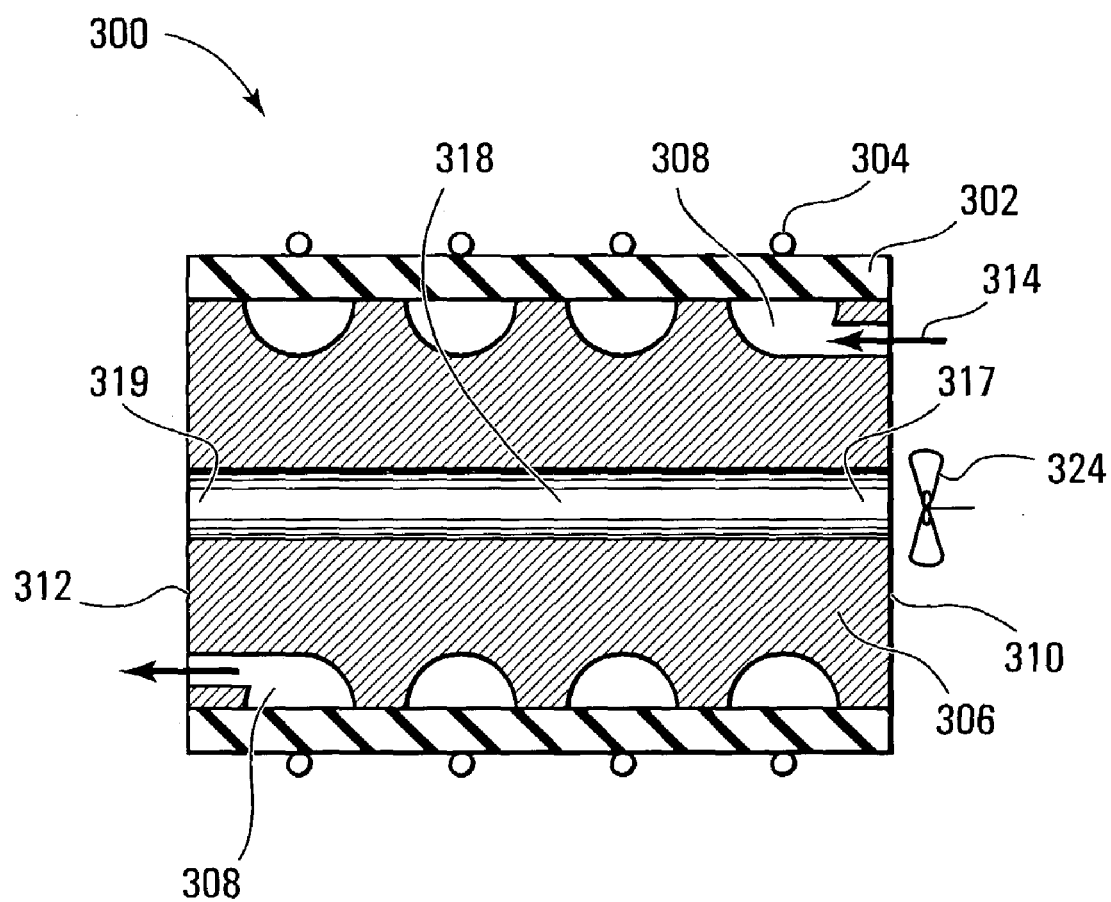
FIG. 12 is a cross-sectional view of an ozone generation cell having a cylindrical shape, in which the ozone generating passageway is helically-shaped.

Referring to FIG. 12, an apparatus according to an alternative embodiment of the invention is shown generally at 300 and includes a cylindrical sleeve 302 formed of a first dielectric material, upon which is helically wound a first conductor 304 at a predefined pitch. The sleeve 302 is received over a generally cylindrical second conductor 306 having a helical groove 308 formed therein at a pitch corresponding to the pitch of the first conductor 304. The second conductor 306 has first and second opposite ends 310 and 312. The first end 310 has an opening 314 in communication with the helical groove 308, to admit air into the helical groove 308. The second end 312 also has an opening 316 in communication with the helical groove 308 to allow air to escape from the helical groove. A fan (not shown) may be used to draw or force air through the helical groove 308, for example.

The second conductor 306 also has a conduit 318 formed axially therein. The conduit 318 extends from the first end 310 to the second end 312 and has access openings 317 and 319 in respective ends. A fan such as shown at 324 may be used to blow or draw cooling air through the conduit 318.

Figure 12A:
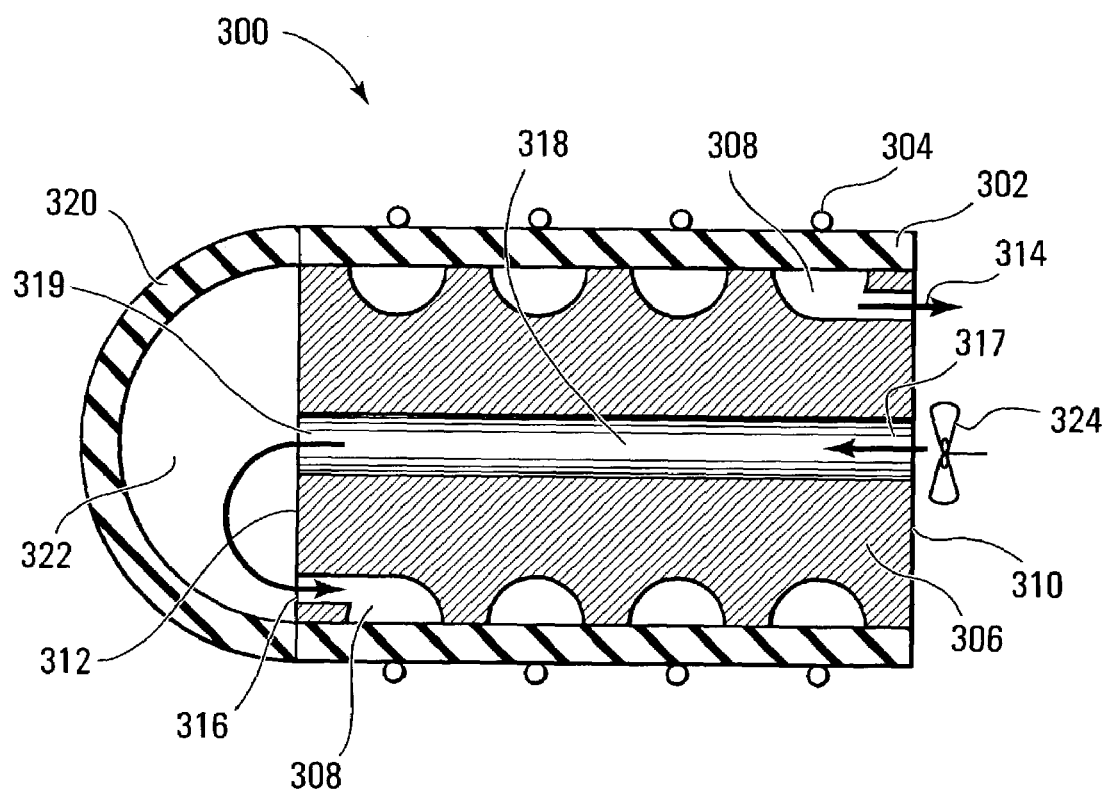

Referring to FIG. 12A the apparatus shown in FIG. 12 may be fitted with a hemispherical end cap 320 secured to the second end 312 and defining an end space 322 in communication with the conduit 318 and the opening 316 such that air entering the helical groove 308 at the first opening 314 may be drawn through the conduit 318 by a fan 324 adjacent the opening 317, or the fan 324 may blow air into the conduit 318 causing it to flow through the conduit 318, through the helical groove 308 and out of the first opening 314.

Block Cell with Insert

Figure 13:
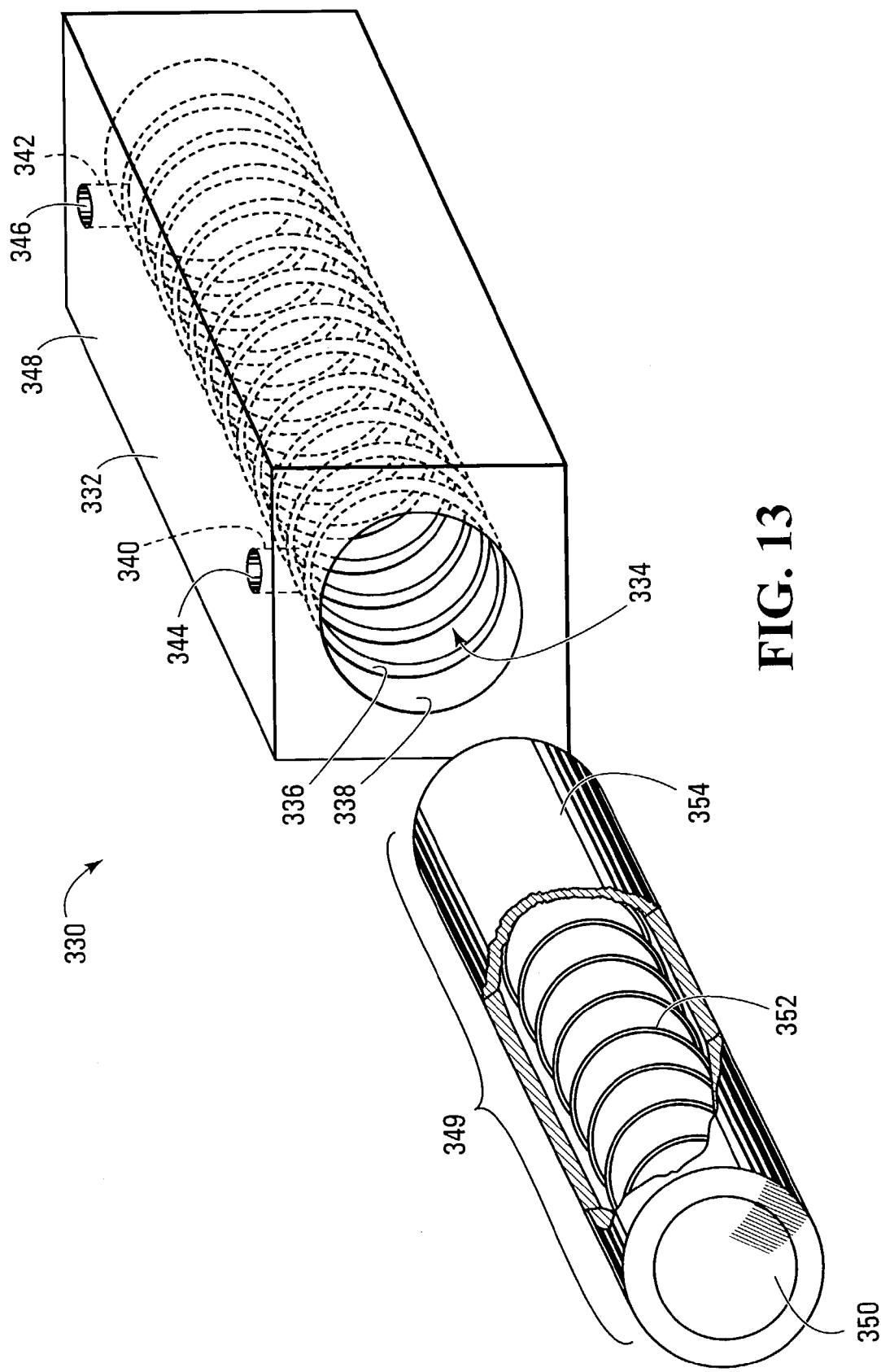
FIG. 13 is an exploded schematic representation of an ozone generation cell according to a further embodiment of the invention in which an ozone generating passageway is formed helically in an inner surface of a bore and an insert on which the first conductor is mounted is inserted in the bore.

Referring to FIG. 13, an apparatus according to another embodiment of the invention is shown generally at 330. In this embodiment, the second conductor is formed of a rectangular block of aluminum 332 having a central bore 334 therein. A helical groove 336 is formed along an inside cylindrical surface 338 of the bore 334 and the helical groove is in communication with first and second conduits 340 and 342 having openings 344 and 346 in an outer face 348 of the block 332. The openings 344 and 346 act as an inlet and an outlet, respectively, for admission and extraction of air, respectively, into and out of the groove 336. An insert 349 comprising a cylindrical core 350 formed of insulative material is wrapped with a helically wound solid conductor 352. Alternatively the cylindrical core may be formed from a hollow glass tube, for example, to allow cooling air to be drawn through the core.

The solid conductor 352 is wound around the core 350 at a pitch corresponding to the pitch of the groove 336 in the second conductor 332. The insert further comprises an insulative sleeve 354 that receives the core 350 and acts as the first dielectric. The insulative sleeve 354 has an outside diameter slightly less than the diameter of the bore 334 to facilitate insertion of the insert 349 into the bore 334.

The groove 336 in the second conductor 332 and the solid conductor 352 wound on the core 350 are configured such that when the insert 349 is fully inserted into the bore 334, the solid conductor 352 is disposed adjacent to and follows the groove 336, in uniform spaced-apart relation.

Cell with Second and Third Conductors

Figure 14:
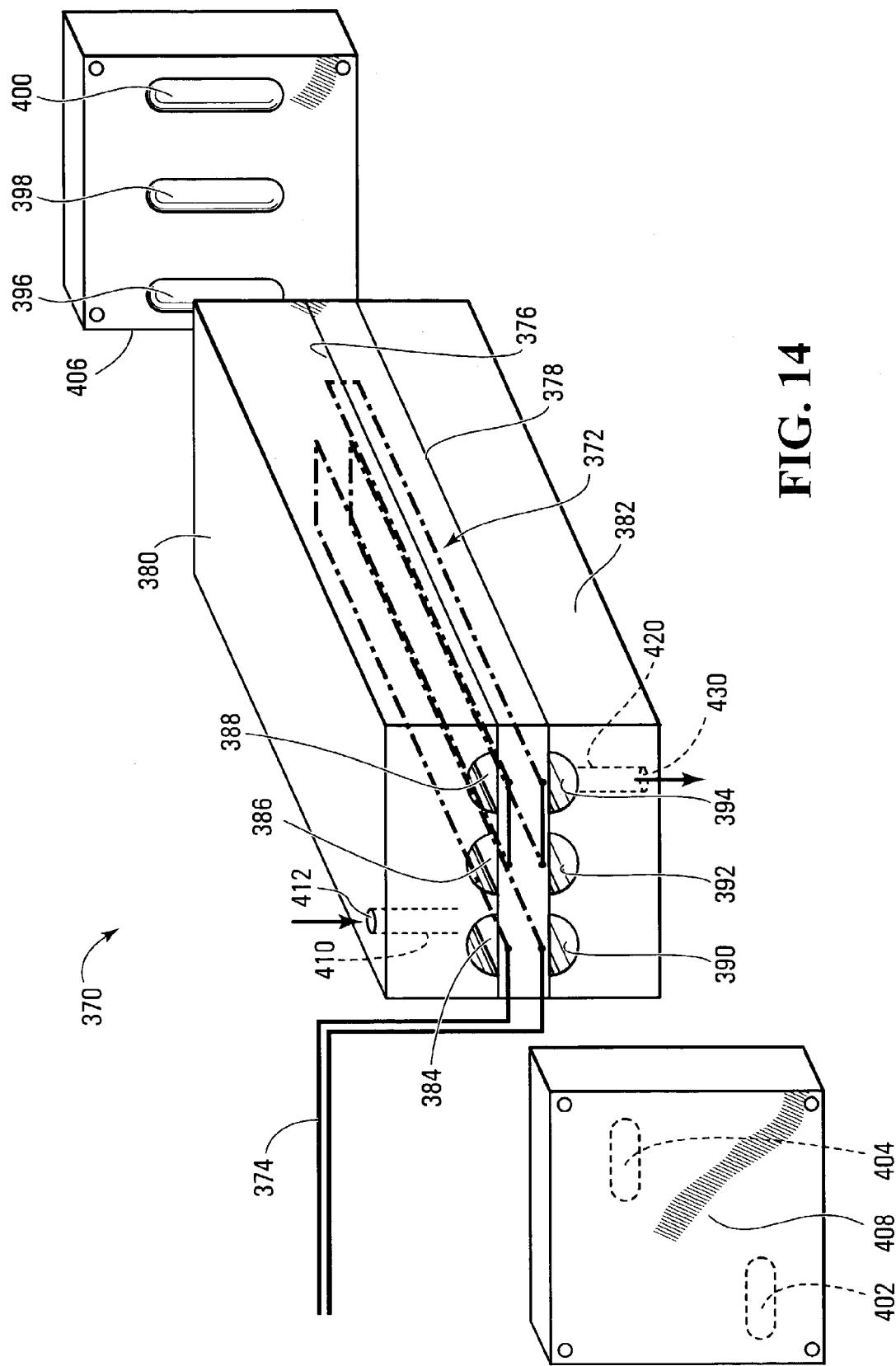
FIG. 14 is an ozone generation cell according to another alternative embodiment of the invention in which a dielectric bearing the first conductor is sandwiched between opposing plates having grooves formed therein, the opposing plates acting as the second conductor.

Referring to FIG. 14, an apparatus according to a further alternative embodiment of the invention is shown generally at 370. This embodiment includes a first dielectric shown generally at 372 in which is formed a serpentine length of solid conductor 374 having straight line segments disposed in parallel spaced-apart planes. In the embodiment shown there are three line segments extending lengthwise in each of two planes in the dielectric material 372. The dielectric material 372 has first and second flat planar mating surfaces 376 and 378 which mate with corresponding flat surfaces of second and third conductors 380 and 382. The second and third conductors 380 and 382 are formed with grooves 384, 386, 388, 390, 392 and 394 that extend lengthwise in parallel spaced-apart relation in the second and third conductors 380 and 382. The grooves 384 to 394 extend between opposite end faces of the second and third conductors 380 and 382 and are placed in communication with adjacent grooves by further grooves 396, 398, 400, 402 and 404 in first and second end plates 406 and 408, respectively. An inlet conduit 410 having an opening 412 in an outer surface of the second conductor 380 extends to the first groove 384 to provide for admission of air into the first groove 384. Similarly, an exit conduit 420 extends between the sixth groove 394 and an opening 430 in a surface of the third conductor 382 to provide for the extraction of air from the sixth groove 394. The first and fourth grooves 384 and 390 are placed in communication with each other by a groove 396 in the end plate 406. The fourth and fifth grooves 390 and 392 and placed in communication with each other by the groove 402 formed in the second end plate 408. Similar communication between adjacent grooves is provided by the remaining grooves 398, 400 and 404, respectively, to couple all of the grooves together to form a long passageway in which ozone can be generated.

Cell with Second and Third Conductors and Cooled First Conductor

Figure 15:
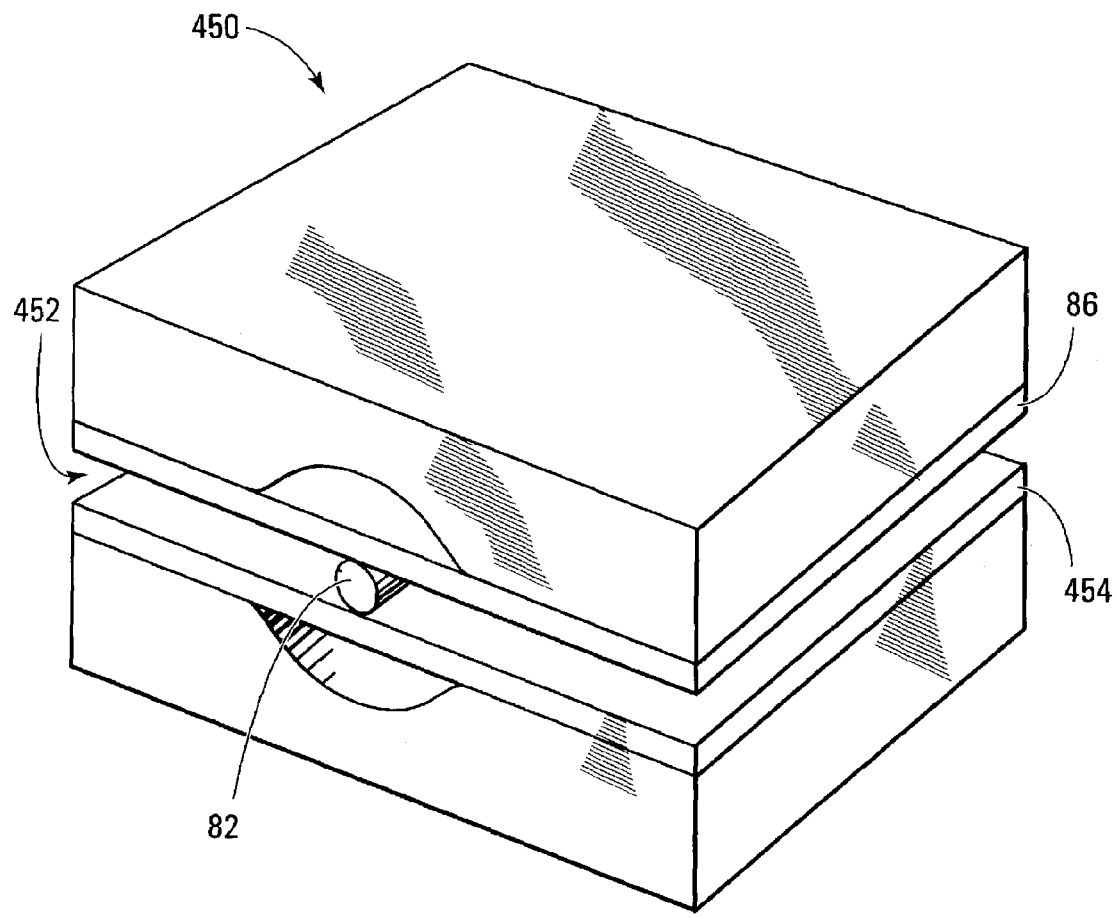
FIG. 15 is a schematic representation of an ozone generation cell according to another alternative embodiment of the invention in which the first conductor is sandwiched between two flat planar dielectrics associated with second and third conductors each having a respective groove adjacent the first conductor.

Referring to FIG. 15, an ozone generation cell according to another embodiment of the invention is shown generally at 450 and includes the configuration shown in FIG. 7A with a duplicate of that configuration located on an opposite side of the first conductor 82 so as to form a gap 452 between respective first dielectric materials 86 and 454. The gap 452 may be used to direct the flow of insulating cooling fluid such as air or liquid, for example, to help cool the first conductor 82. A similar configuration may alternatively be used in the embodiment shown in FIG. 14, for example.

While specific embodiments of the invention have been described and illustrated, such embodiments should be considered illustrative of the invention only and not as limiting the invention as construed in accordance with the accompanying claims.

What is claimed is:

1. An ozone generation cell comprising:
   a first conductor generally having a line geometry;
   a second conductor having a first groove formed in a surface thereof, and having first and second flanks on opposite sides of said first groove, said second conductor and said first groove being arranged such that said first groove follows said first conductor in parallel spaced-apart relation; and
   a first dielectric having a first passage-defining portion positioned between said first conductor and said first groove and said first dielectric having first and second side portions on opposite sides of said passage-defining portion and generally parallel to said first and second flanks respectively;
   said first passage-defining portion being spaced-apart from only one of said first conductor and said first groove to form a first fluid passageway defined in part by said first passage-defining portion, for conducting fluid from which ozone may be obtained when an electric field of sufficient strength is produced in said first fluid passageway by a potential applied across said first and said second conductors.

2. The ozone generation cell of claim 1 further comprising a heat sink adjacent said first groove.

3. The ozone generation cell of claims 2 wherein said second conductor includes said heat sink.

4. The ozone generation cell of claim 3 wherein said heat sink extends on at least one side of said first groove.

5. The ozone generation cell of claim 3 wherein said heat sink extends on both sides of said first groove.

6. The ozone generation cell of claim 1 wherein said first conductor has a solid cross-section.

7. The ozone generation cell of claim 1 wherein said first conductor has a generally circular-shaped cross-section.

8. The ozone generation cell of claim 1 wherein said first conductor has a generally oval-shaped cross-section.

9. The ozone generation cell of claim 1 wherein said first conductor has a generally rectangular-shaped cross-section.

10. The ozone generation cell of claim 1 wherein said first conductor has a generally "C"-shaped cross-section.

11. The ozone generation cell of claim 1 wherein said first conductor has a conduit extending therethrough.

12. The ozone generation cell of claim 1 wherein said first groove has a first groove surface that is generally concentric with a longitudinal axis of said first conductor.

13. The ozone generation cell of claim 1 wherein said first groove surface is disposed at a generally uniform distance from an outer surface of said first conductor.

14. The ozone generation cell of claim 1 wherein said first passage-defining portion comprises a first parallel surface spaced-apart from said first groove by a generally uniform depth distance.

15. The ozone generation cell of claim 14 wherein said first passage-defining portion comprises first and second generally flat surfaces on opposite sides of said first parallel surface.

16. The ozone generation cell of claim 15 wherein said depth distance is approximately equal to a width of said first groove.

17. The ozone generation cell of claim 16 wherein said parallel surface is spaced-apart from an outer surface of said first conductor by a generally uniform thickness distance.

18. The ozone generation cell of claim 17 wherein said thickness distance is less than or equal to said depth distance.

19. The ozone generation cell of claim 1 wherein said first groove is generally uniformly curved.

20. The ozone generation cell of claim 1 wherein said first passage-defining portion is generally uniformly curved.

21. The ozone generation cell of claim 1 wherein said second conductor has first and second coplanar surfaces on opposite sides of said first groove.

22. The ozone generation cell of claim 21 wherein said first dielectric has first and second coplanar surfaces on opposite sides of said first passage-defining portion, said first and second coplanar surfaces of said dielectric being fastened to said first and second coplanar surfaces of said second conductor.

23. The ozone generation cell of claim 1 further comprising a second dielectric in said first groove.

24. The ozone generation cell of claim 23 wherein said second dielectric is comprised of a dielectric coating on a surface of said first groove.

25. The ozone generation cell of claim 1 wherein said passage-defining portion includes a flat surface covering said first groove.

26. The ozone generation cell of claim 1 wherein said first dielectric, said first conductor and said second conductor are gas-impervious.

27. The ozone generation cell of claim 1 wherein said first conductor is comprised of a partially conductive coating.

28. The ozone generation cell of claim 1 wherein said second electrode has a plurality of grooves formed therein.

29. The ozone generation cell of claim 28 wherein said first conductor has portions that extend parallel to and spaced-apart from corresponding grooves of said plurality of grooves in said second conductor.

30. The ozone generation cell of claim 29 wherein said grooves of said plurality of grooves are generally parallel to each other.

31. The ozone generation cell of claim 29 wherein said second conductor has a conduit extending therethrough, for conducting fluid to said grooves.

32. The ozone generation cell of claim 31 further comprising a first fluid flow director for directing fluid from said conduit to said groves.

33. The ozone generation cell of claim 32 wherein said cell includes a second fluid flow director for directing fluid from one groove to another groove.

34. The ozone generation cell of claim 1 further comprising a third conductor having a second groove formed in a surface thereof, and having third and fourth flanks on opposite sides of said second groove, said third conductor and said second groove being arranged such that said second groove follows said first conductor in parallel spaced-apart relation; and a second dielectric having a second passage-defining portion positioned between said first conductor and said second groove and said second dielectric having third and fourth side portions on opposite sides of said second passage-defining portion and generally parallel to said third and fourth flanks, respectively, said second passage-defining portion being spaced-apart from only one of said first conductor and said second groove to form a second fluid passageway defined in part by said second passage-defining portion, for conducting fluid from which ozone may be obtained when an electric field of sufficient strength is produced in said second fluid passageway by a potential applied across said first and said third conductors.

35. The ozone generation cell of claim 34 wherein said first and second dielectric materials have first and second spaced-apart facing surfaces forming a coolant passageway therebetween.

* * * * *